United States Patent
Satoh et al.

(10) Patent No.: US 7,467,061 B2
(45) Date of Patent: Dec. 16, 2008

(54) INFORMATION PROCESSING METHOD AND APPARATUS FOR FINDING POSITION AND ORIENTATION OF TARGETED OBJECT

(75) Inventors: Kiyohide Satoh, Kawasaki (JP); Shinji Uchiyama, Yokohama (JP); Takaaki Endo, Urayasu (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 633 days.

(21) Appl. No.: 11/126,437

(22) Filed: May 11, 2005

(65) Prior Publication Data

US 2005/0256391 A1 Nov. 17, 2005

(30) Foreign Application Priority Data

| May 14, 2004 | (JP) | .............................. 2004-144893 |
| May 14, 2004 | (JP) | .............................. 2004-144894 |
| Feb. 28, 2005 | (JP) | .............................. 2005-053441 |

(51) Int. Cl.
*G01C 9/00* (2006.01)
(52) U.S. Cl. ....................................... 702/150; 702/92
(58) Field of Classification Search ......... 702/150–153, 702/92–95
See application file for complete search history.

(56) References Cited

U.S. PATENT DOCUMENTS 6,968,282 B1 * 11/2005 Jackson et al. ................ 702/94

2004/0176925 A1 9/2004 Satoh

OTHER PUBLICATIONS

Satoh, et al. "A Hybrid Registration Method for Outdoor Augmented Reality", Augmented Reality, 2001, Proceedings, IEEE and ACM International Symposium Oct. 29-30, 2001, p. 67-76.
Satoh, et al. "Robust Vision-Based Registration Utilizing Bird's-Eye View with user's View" Augmented Reality, 2003, Proceedings, the second IEEE and Symposium on Oct. 7-10, 2003, p. 46-55.
Jun Park, et al., "Vision-based Pose Computation: Robust and Accurate Augmented . . . ", Proc. Second International Workshop on Augmented Reality (IWAR'99), pp. 3-12, 1999.

(Continued)

*Primary Examiner*—Bryan Bui
*Assistant Examiner*—Stephen J Cherry
(74) *Attorney, Agent, or Firm*—Canon U.S.A. Inc., I.P. Division

(57) ABSTRACT

In an information processing method, an orientation sensor is mounted on a targeted object to be measured, and bird's-eye view cameras for capturing images of the targeted object are fixedly installed. From the images captured by the bird's-eye view cameras, an index detecting unit detects indices mounted on the orientation sensor. A measured orientation value from the orientation sensor is input to an orientation predicting unit, and the orientation predicting unit predicts the present orientation of the targeted object based on an azimuth-drift-error correction value. A position-orientation calculating unit uses the image coordinates of the detected indices to calculate the position of the imaging device and an update value of the azimuth-drift-error correction value, which are unknown parameters. From the obtained parameters, the position-orientation calculating unit finds and outputs the position and orientation of the targeted object.

9 Claims, 11 Drawing Sheets

OTHER PUBLICATIONS

Takahashi, et al., "A High Accuracy Realtime 3D Measuring method of Marker for VR Interface by . . . ", 3D Image Conference 96, Niigata University, pp. 167-172, Jul. 1996.

Lowe, "Fitting parameterized three-dimensional models to images", IEEE Transactions on PAMI, vol. 13, No. 5, pp. 441 to 450, 1991.

Kato, et al., "Augmented Reality System based on Marker Tracking and Calibration Thereof.", The Virtual Reality Soc. of Japan, vol. 4, No. 4, pp. 607-616, 1999.

K. Satoh, et, al.Takahashi,et al., "High-accuracy Real-time Method for Estimating Position and Orientation . . . ", 3D Image Conference '96, Collected papers, pp. 167-172, 1996.

* cited by examiner

INFORMATION PROCESSING METHOD AND APPARATUS FOR FINDING POSITION AND ORIENTATION OF TARGETED OBJECT

BACKGROUND OF THE INVENTION

1. Field of the Invention

The present invention relates to an apparatus and method for measuring the position and orientation of an object.

2. Description of the Related Art

Recently, research concerning mixed reality for the purpose of seamless linkage between a real space and a virtual space has been actively conducted. An image display apparatus for displaying mixed reality is realized by so-called "video see-through" in which a virtual space image (e.g., a virtual object drawn by computer graphics, text information, etc.), generated in response to the position and orientation of an imaging device such as a video camera, is drawn so as to be superimposed on a real space image captured by the imaging device, whereby a superimposition image is displayed.

In addition, the image display apparatus can also be realized by so-called "optical see-through" in which a virtual space image, generated in response to the position and orientation of an observer's viewpoint, is displayed on an optical see-through display mounted on the head of the observer.

New fields different from those in virtual reality of the related art, such as operation assistance in which an internal state is displayed in superimposed form on the surface of a patient's body, and a mixed reality game in which a player fights with virtual enemies floating in real space, are expected as applications of such image display apparatuses.

What is required in common for these applications is the accuracy with which the registration between the real space and the virtual space is performed. Many such attempts have been performed. In the case of video see-through, a problem of registration in a mixed reality is equivalent to as a problem of finding the position and orientation of the imaging device in a scene (i.e., in a world coordinate system). Similarly, in the case of the optical see-through, the problem of registration in mixed reality sense concludes as a problem of finding, in a scene, the position and orientation of the display or the observer's viewpoint.

As a method for solving the former problem, it is common to find the position and orientation of the imaging device in the scene by disposing or setting a plurality of indices in a scene and detecting the coordinates of projected images of the indices in an image captured by an imaging device. In addition, there are attempts to realize registration more stable than that in the case of only using image information by using inertial sensors mounted on the imaging device. More specifically, the position and orientation of the imaging device, estimated based on values measured by the inertial sensors, is used for index detection. The estimated position and orientation is also used as initial values for calculation of a position and orientation based on an image, or as a rough position and orientation even if no indices are found (e.g., Hirofumi FUJII, Masayuki KANBARA, Hidehiko IWASA, Haruo TAKEMURA, Naokazu YOKOYA, "*Kakuchogenjitsu-notameno Jairosensa-wo Heiyoshita Sutereokamera-niyoru Ichiawase* (registration with a stereo camera by jointly using a gyro sensor for augmented reality)", *Denshi Joho Tsushin Gakkai* (Institute of Electronics, Information and Communication Engineers) *Gijutsu Hokoku* (Technical report) PRMU99-192 (*Shingaku Giho* (Technical Report of IEICE), vol. 99, no. 574, pp. 1-8)".

As a method for solving the latter problem, it is common that, by mounting an imaging device (and inertial sensors) on a targeted object (i.e., the head of an observer or a display) to be measured, and finding the position and orientation of the imaging device in a manner similar to the former case, the position and orientation of the targeted object are found from relationships of known relative positions and orientations between the imaging device and the targeted object.

However, in the above methods of the related art, in a situation in which a subjective viewpoint image does not include image information sufficient for realizing stable registration, for example, when indices locally existing in a portion of an image are observed, and when only three indices are observed and index detection includes an error, accuracy and stability of an obtained solution may become insufficient. In addition, when the number of indices observed is not greater than two, no solution can be found. To avoid these problems, a large number of indices need to be evenly set in the scene. This causes problems in that it is difficult to identify indices and in that the real space image is deformed. In addition, there is a problem in that, in a situation in which images of indices on a subjective viewpoint image are covered with an observer's hand, registration is completely impossible.

SUMMARY OF THE INVENTION

According to an aspect of the present invention, an information processing method for calculating the position and orientation of an object includes the steps of, from an imaging device for capturing an image of the object from a bird's-eye view position with respect to the object, inputting the captured image, inputting a measured orientation value from an orientation sensor for measuring information concerning the orientation of the object, from the captured image, detecting a feature value concerning the image coordinates of an index disposed on the object, and finding a parameter concerning the azimuth of the object and a parameter concerning the position of the object, the parameters being regarded as at least unknown parameters, by using the detected feature value concerning the image coordinates of the index, and calculating the position and orientation of the object by using the obtained parameters.

According to another aspect of the present invention, an information processing method for calculating the position and orientation of an imaging device for capturing images of a scene is provided. The information processing method includes a first image input step of inputting a first image captured by the imaging device, a second image input step of inputting a second image captured by a bird's-eye-view imaging unit for performing image capturing from a bird's-eye view position of the imaging device, an orientation input step of inputting a measured orientation value from an orientation sensor for measuring information concerning the orientation of the imaging device, a first detecting step of detecting, from the first image input in the first image input step, a first-index image-coordinate feature value concerning the image coordinates of a first index disposed in the scene, a second detecting step of detecting, from the second image input in the second image input step, a second-index image-coordinate feature value concerning the image coordinates of a second index disposed on the imaging device, and a position-and-orientation calculating step of calculating the position and orientation of the imaging device by using the first-index image-coordinate feature value detected in the first detecting step, the second-index image-coordinate feature value detected in the second detecting step, and the measured orientation value input in the orientation input step.

According to another aspect of the present invention, an information processing method for calculating the position and orientation of an imaging device for capturing images of a scene is provided. The information processing method includes a first image input step of inputting a first image captured by the imaging device, a second image input step of inputting a second image captured by a bird's-eye-view imaging unit for capturing images of the scene from a viewpoint position on the imaging device, an orientation input step of inputting a measured orientation value from an orientation sensor for measuring information concerning the orientation of the imaging device, a first detecting step of detecting a first-index image-coordinate feature value concerning the image coordinates of a first index disposed in the scene from the first image input in the first image input step, a second detecting step of detecting a second-index image-coordinate feature value concerning the image coordinates of a second index disposed on the imaging device, and a position-and-orientation calculating step of calculating the position and orientation of the imaging device by using the first-index image-coordinate detected in the first detecting step, the second-index image-coordinate detected in the second detecting step, and the measured orientation value input in the orientation input step.

According to another aspect of the present invention, an information processing apparatus for calculating the position and orientation of an object is provided. The information processing apparatus includes a captured image input unit which, from an imaging device for capturing an image of the object from a bird's-eye view position with respect to the object, inputs the captured image, a measured orientation value input unit which inputs a measured orientation value from an orientation sensor for measuring information concerning the orientation of the object, a detecting unit which, from the captured image, detects a feature value concerning the image coordinates of an index disposed on the object, and a position-and-orientation calculating unit which finds a parameter concerning the azimuth of the object and a parameter concerning the position of the object, the parameters being regarded as at least unknown parameters, by using the detected feature value concerning the image coordinates of the index, and which calculates the position and orientation of the object by using the obtained parameters.

According to another aspect of the present invention, an information processing apparatus for calculating the position and orientation of an imaging device for capturing images of a scene is provided. The information processing apparatus includes a first image input unit for inputting a first image captured by the imaging device, a second image input unit for inputting a second image captured by a bird's-eye-view imaging unit for performing image capturing from a viewpoint position on the imaging device, an orientation input unit which inputs a measured orientation value from an orientation sensor for measuring information concerning the orientation of the imaging device, a first detecting unit which, from the first image input in a step of inputting the first image, detects a first-index image-coordinate feature value concerning the image coordinates of a first index disposed in the scene, a second detecting unit which, from the second image input in a step of inputting the second image, detects a second-index image-coordinate feature value concerning the image coordinates of a second index disposed on the imaging device, and a position-and-orientation calculating unit which calculates the position and orientation of the imaging device by using the first-index image-coordinate feature value detected by the first detecting unit, the second-index image-coordinate feature value detected by the second detecting unit, and the measured orientation value input by the orientation input unit.

According to another aspect of the present invention, an information processing apparatus for calculating the position and orientation of an imaging device for capturing images of a scene is provided. The information processing apparatus includes a first image input unit for inputting a first image captured by the imaging device, a second image input unit for inputting a second image captured by a bird's-eye-view imaging unit for performing image capturing from a viewpoint position on the imaging device, an orientation input unit which inputs a measured orientation value from an orientation sensor for measuring information concerning the orientation of the imaging device, a first detecting unit which, from the first image input by the first image input unit, detects a first-index image-coordinate feature value concerning the image coordinates of a first index disposed in the scene, a second detecting unit which, from the second image input by the second image input unit, detects a second-index image-coordinate feature value concerning the image coordinates of a second index disposed on the imaging device, and a position-and-orientation calculating unit which calculates the position and orientation of the imaging device by using the first-index image-coordinate feature value detected by the first detecting unit, the second-index image-coordinate feature value detected by the second detecting unit, and the measured orientation value input by the orientation input unit.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Preferred embodiments of the present invention will now be described in detail in accordance with the accompanying drawings.

First Embodiment

A position-and-orientation measuring apparatus according to a first embodiment of the present invention measures the position and orientation of an arbitrary targeted object to be measured. The position-and-orientation measuring apparatus according to the embodiment and a position-and-orientation measuring method therefor are described below.

Figure 1:
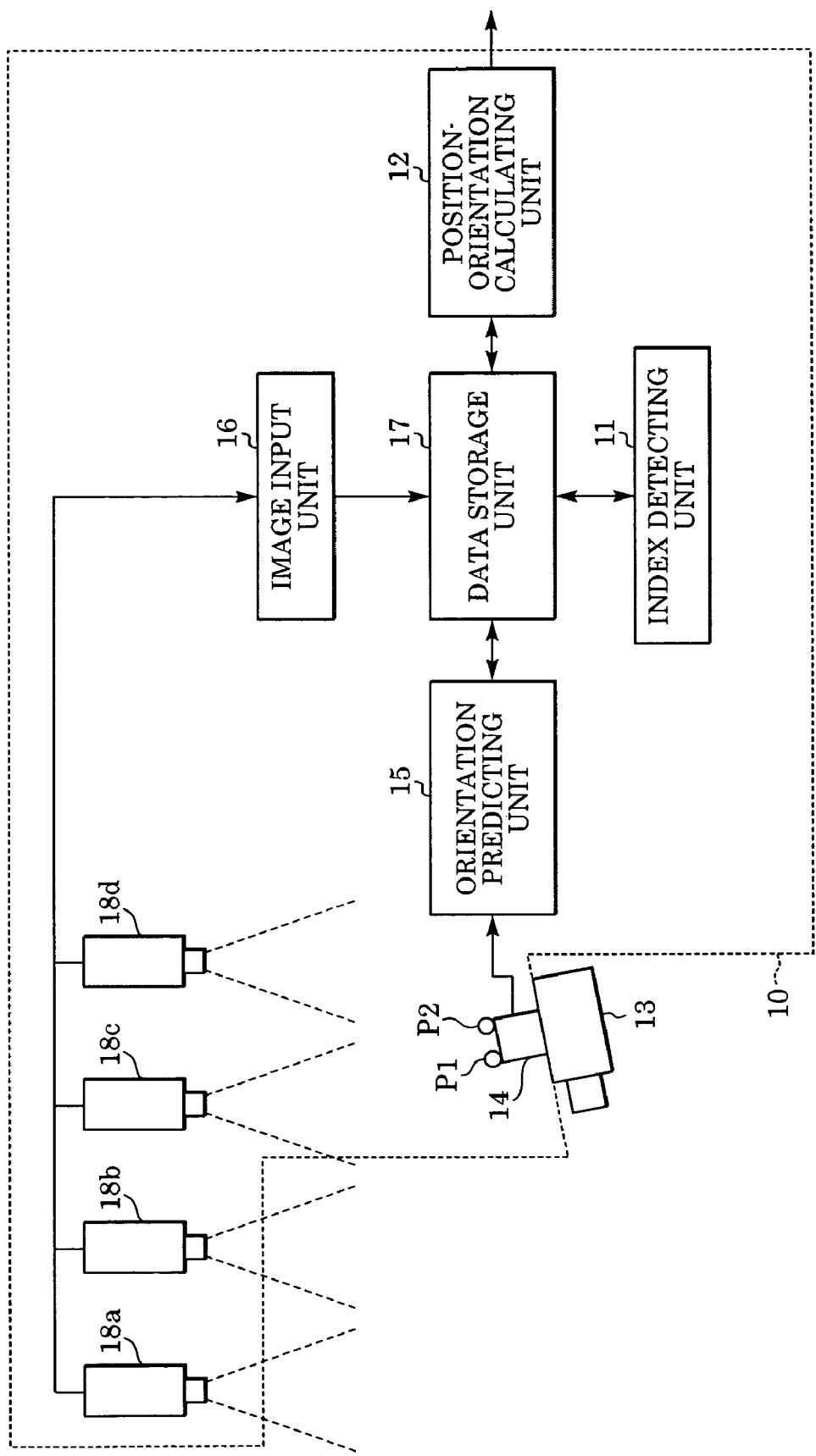
FIG. 1 is a block diagram showing a position-and-orientation measuring apparatus according to a first embodiment of the present invention.

FIG. 1 shows the configuration of a position-and-orientation measuring apparatus 10 according to the first embodiment. As shown in FIG. 1, the position-and-orientation measuring apparatus 10 includes bird's-eye view cameras 18a, 18b, 18c, and 18d, an image input unit 16, a data storage unit 17, an index detecting unit 11, an orientation sensor 14, an orientation predicting unit 15, and a position-orientation calculating unit 12. The position-and-orientation measuring apparatus 10 is connected to a targeted object 13 to be measured.

At a plurality of positions on the orientation sensor 14 and/or the targeted object 13, indices $P_k$ (k=1, . . . , K) (hereinafter referred to as "bird's-eye view indices" or simply "indices") in which positions $x_c^{Pk}$ in an object coordinate system are known are set to be observed by the bird's-eye view cameras 18a, 18b, 18c, and 18d. Here the object coordinate system is defined by an origin and three perpendicularly intersecting axes on the targeted object 13.

It is preferable that these indices be set so that, when the targeted object 13 is positioned at each point in a measurement range in which position and orientation measurement is to be performed, the total number of (physical) indices observed in bird's-eye view images acquired by the bird's-eye view cameras 18a, 18b, 18c, and 18d be at least two. The example shown in FIG. 1 shows a state in which two indices $P_1$ and $P_2$ are set and index $P_1$ is included in a field of view of the bird's-eye view camera 18c and index $P_2$ is included in fields of view of the bird's-eye view cameras 18c and 18d.

Indices $P_k$ may be formed of, for example, spherical or circular markers having different colors, or may be formed of feature points such as natural features having different texture features. Indices $P_k$ may have any index form if coordinates of a projected image in a captured image can be detected and each index can be identified. In addition, indices $P_k$ may be deliberately set or may have natural shapes which are formed without being deliberately set.

The bird's-eye view cameras 18a, 18b, 18c, and 18d are fixedly disposed at such positions that, when the targeted object 13 is positioned in the measurement range, one of the bird's-eye view cameras 18a, 18b, 18c, and 18d can capture the image of the targeted object 13. Hereinafter, we use a term "bird's-eye view camera" to indicate the camera that observes the targeted object 13 from a third-persons viewpoint; the position of the camera is not limited to the "bird's-eye" position. The positions and orientations of the bird's-eye view cameras 18a, 18b, 18c, and 18d in the world coordinate system should be stored beforehand as known values in the data storage unit 17. Images (hereinafter referred to as "bird's-eye view images") output by the bird's-eye view cameras 18a, 18b, 18c, and 18d are input to the image input unit 16.

The input images are converted into digital data by the image input unit 16, and are stored in the data storage unit 17.

The orientation sensor 14 is mounted on the targeted object 13. The orientation sensor 14 measures its present orientation and outputs measured values to the orientation predicting unit 15. The orientation sensor 14 is a sensor unit based on angular rate sensors such as gyroscopes, and is formed of, for example, a TISS-5-40 made by Tokimec Inc. in Japan, or an InertiaCube2 made by InterSense Inc. in the United States. A measured orientation value obtained by the above sensor is an orientation having an error, which differs from the actual orientation. The above orientation sensor has, as components, some acceleration sensors for observing the gravitational direction of the earth, and has a function of canceling accumulation of drift error in the direction of an angle of inclination. Thus, the above orientation sensor has a property of producing no drift error in the direction of the angle of inclination (pitch angle and roll angle). In other words, the above sensor has drift error that is accumulated with the lapse of time concerning an angle around the gravitational axis, that is an azimuth (yaw) angle direction.

The orientation predicting unit 15 receives azimuth-drift-error correction value φ from the data storage unit 17, predicts the orientation of the targeted object 13 by correcting the measured orientation value input from the orientation sensor 14, and outputs the predicted orientation to the data storage unit 17.

Bird's-eye view images are input from the data storage unit 17 to the index detecting unit 11, and the image coordinates of indices in the input images are detected. For example, when the indices are formed of markers having different colors, regions that correspond to the markers' colors are detected from the bird's-eye view images, and their barycentric positions are used as detected coordinates of the indices. When the indices are formed of feature points having different texture features, the positions of the indices are detected by implementing, on the bird's-eye view images, template matching based on template images for the indices which are stored beforehand as known information. It is possible to limit a search range by predicting the position of each index in the image based on a calculated value of the position of the targeted object 13 which is the output of the position-orientation calculating unit 12 and stored in the data storage unit 17, and a predicted value of the orientation of the targeted object 13 which is the output of the orientation predicting unit 15 and also stored in the data storage unit 17. By this option, the calculation load required for index detection can be reduced and false detection and false identification of indices can be reduced.

The index detecting unit 11 outputs the image coordinates of the detected indices and their identifiers to the data storage unit 17. By using camera identifier x (x=a, b, c, d) and identifier m (m=1, . . . , $M_x$), where $M_x$ represents the number of indices detected in each of the bird's-eye view images, the indices detected by the index detecting unit 11 for the captured images of the bird's-eye view cameras 18a, 18b, 18c, and 18d are hereinafter represented by $P_{kxm}$. In addition, depending on the identifiers of the bird's-eye view cameras 18a, 18b, 18c, and 18d, the coordinates of indices $P_{kxm}$ detected for the images are represented by $u_a^{Pkam}$, $u_b^{Pkbm}$, $u_c^{Pkcm}$, $u_d^{Pkdm}$, respectively. M represents the total number of indices detected in each image. For example, in the case of FIG. 1, $M_a=0$, $M_b=0$, $M_c=2$, $M_d=1$, and M=3. Accordingly, index identifiers $k_{c1}=1$, $k_{c2}=2$, and $k_{d1}=2$, the identifiers of bird's-eye view cameras which photograph these index identifiers, and image coordinates $u_c^{Pkc1}$, $u_c^{Pkc2}$ and $u_d^{Pkd1}$ which correspond to the identifiers are output.

From the data storage unit 17, the predicted value of the orientation of the targeted object 13, and sets of image coordinates $u_a^{Pkam}$, $u_b^{Pkbm}$, $u_c^{Pkcm}$, and $u_d^{Pkdm}$ of the indices detected by the index detecting unit 11 and corresponding object coordinates (coordinate values in the object coordinate system) $x_C^{Pkam}$, $x_C^{Pkbm}$, $x_C^{Pkcm}$, and $x_C^{Pkdm}$ are input to position-orientation calculating unit 12. The position-orientation calculating unit 12 calculates the position and orientation of the targeted object 13 based on the above information, and outputs the calculated position and orientation to the exterior through an interface (not shown). In addition, the position-orientation calculating unit 12 outputs the calculated position of the targeted object 13 to the data storage unit 17, and updates the azimuth-drift-error correction value stored in the data storage unit 17 by using an update value of the azimuth-drift-error correction value of the orientation sensor 14 which is derived from the process of calculating the position and orientation of the targeted object 13.

The data storage unit 17 stores the azimuth-drift-error correction value, the images input from the image input unit 16, the predicted value of the orientation input from the orientation predicting unit 15, the calculated value of the position input from the position-orientation calculating unit 12, the image coordinates and identifiers of the indices input from the index detecting unit 11, and data such as object coordinates (coordinate values in the object coordinate system) of the indices, and camera parameters of the bird's-eye view cameras 18a, 18b, 18c, and 18d, which are known values. The data storage unit 17 inputs and outputs the stored data, if necessary.

The image input unit 16, data storage unit 17, index detecting unit 11, orientation predicting unit 15, and position-orientation calculating unit 12, shown in FIG. 1 may be treated as separate devices. In addition, the functions of the image input unit 16, data storage unit 17, index detecting unit 11, orientation predicting unit 15, and position-orientation calculating unit 12, shown in FIG. 1, may be implemented by installing software into one or more computers and allowing a central processing unit (CPU) of each computer to execute the installed software. In the first embodiment, each of the image input unit 16, data storage unit 17, index detecting unit 11, orientation predicting unit 15, and position-orientation calculating unit 12, shown in FIG. 1, is treated as software to be executed by a single computer.

Figure 2:
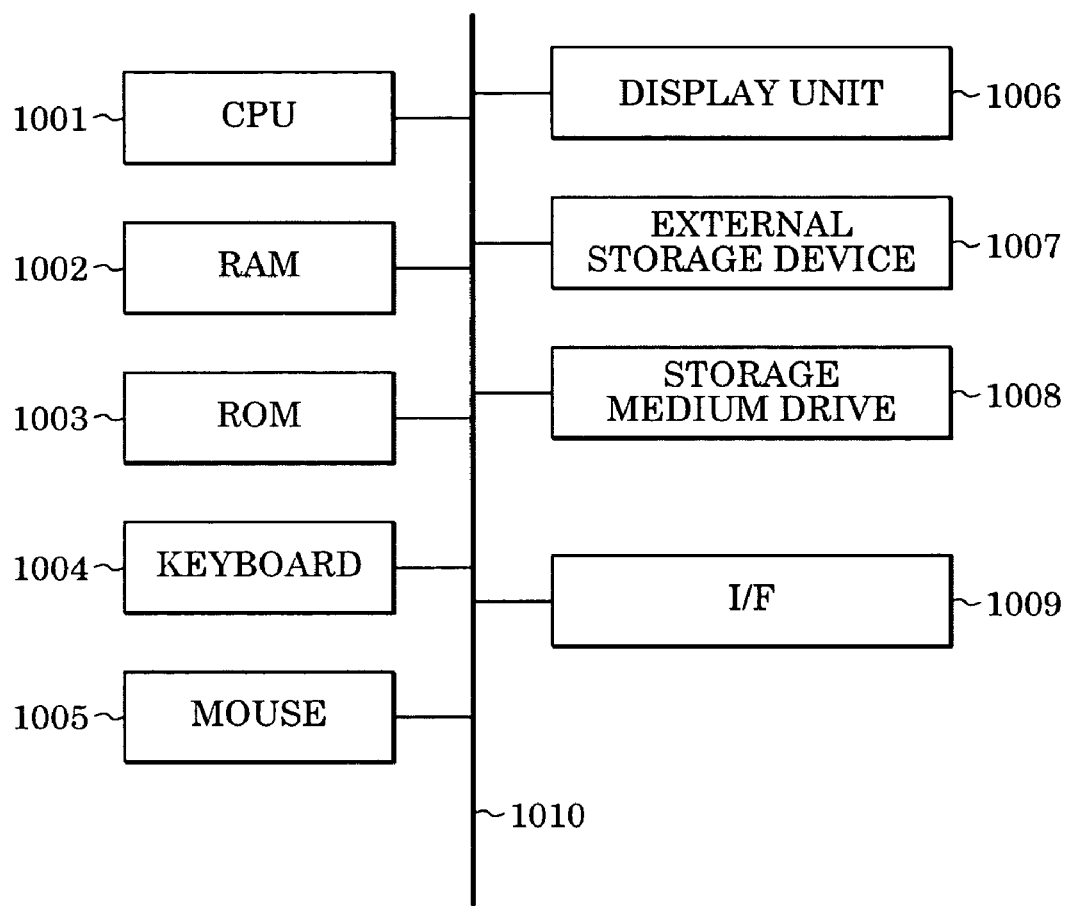
FIG. 2 is a block diagram showing the basic configuration of a computer.

FIG. 2 is a block diagram showing the basic configuration of a computer that executes, as software, each of the image input unit 16, data storage unit 17, index detecting unit 11, orientation predicting unit 15, and position-orientation calculating unit 12, shown in FIG. 1.

A CPU 1001 controls the entirety of the computer by using programs and data stored in a random access memory (RAM) 1002 and a read-only memory (ROM) 1003. By controlling execution of software corresponding to the image input unit 16, the index detecting unit 11, the orientation predicting unit 15, and the position-orientation calculating unit 12, the CPU 1001 realizes the function of each unit.

The RAM 1002 includes an area for temporarily storing a program and data loaded from the external storage device 1007 or the storage medium drive 1008, and also includes the work area required for the CPU 1001 to perform various types of processing. The function of the data storage unit 17 is realized by the RAM 1002.

The ROM 1003 stores, in general, a program stored for the computer and setting data. A keyboard 1004 and a mouse 1005 are used by an operator to input various instructions to the CPU 1001.

A display unit 1006 is formed of a cathode-ray tube, a liquid crystal display screen, or the like, and can display, for example, a message, etc., which are to be displayed for position and orientation measurement of the targeted object 13.

The external storage device 1007 functions as a large volume information storage device, and stores an operating system, software programs, etc. In the description of the first embodiment, information that is described as known is stored in the external storage device 1007, and is loaded into the RAM 1002, if necessary.

A storage medium drive 1008 reads a program or data stored in a recording medium such as CD-ROM or DVD-ROM in response to an instruction of the CPU 1001, and outputs the read program or data to the RAM 1002 or the external storage device 1007.

An interface 1009 includes an analog video port or digital input/output port, such as the IEEE 1394 standard, for connecting the bird's-eye view cameras 18, RS-233C or USB serial port for connecting the orientation sensor 14, and the Ethernet port for outputting the position and orientation of the targeted object 13 to the exterior. Input data is loaded into the RAM 1002 through the interface 1009. Part of the function of the image input unit 16 is realized by the interface 1009.

A bus 1010 is used to connect the CPU 1001, the RAM 1002, the ROM 1003, the keyboard 1004, the mouse 1005, the display unit 1006, the external storage device 1007, the storage medium drive 1008, and the interface 1009.

Figure 3:
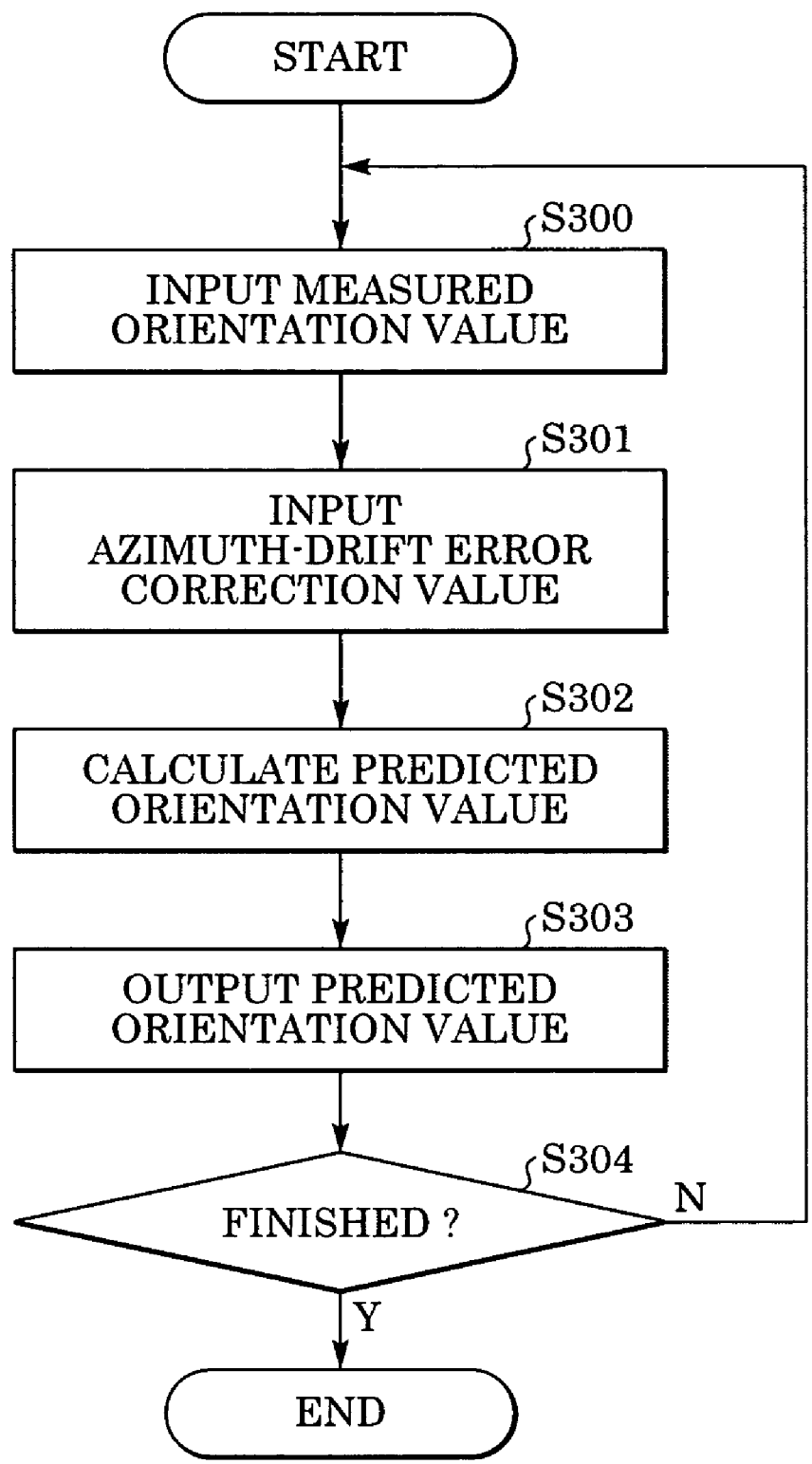
FIG. 3 is a flowchart showing a process which calculates parameters representing the position and orientation of a targeted object and which is performed such that the software program of the orientation predicting unit shown in FIG. 1 is executed by the CPU shown in FIG. 2.

FIG. 3 is a flowchart showing a process of the orientation predicting unit 15. This process is performed such that the CPU 1001 executes the software program of the orientation predicting unit 15. In a stage prior to implementation of the following process, program code in accordance with the flowchart should be loaded into the RAM 1002 beforehand.

Although there are various methods for representing an orientation, in this embodiment, an orientation is represented by 3-by-3 rotating matrix R.

In step S300, measured orientation value R# (the representation # is a symbol representing a sensor-measured value) is input from the orientation sensor 14 to the orientation predicting unit 15.

In step S301, azimuth-drift-error correction value φ* is input from the data storage unit 17 to the orientation predicting unit 15.

In step S302, by subjecting measured orientation value R# (representing the orientation of the orientation sensor 14) to a transformation from the orientation of the orientation sensor 14 to that of the targeted object 13, and correcting drift error based on the azimuth-drift-error correction value φ*, the orientation predicting unit 15 calculates the orientation of the targeted object 13 as a predicted orientation value R*.

$$R^* = \Delta R(\phi^*) \cdot R\# \cdot R_{SC} \qquad (1)$$

where $\Delta R(\phi)$ represents a rotating matrix that adds rotation by $\phi$ in the azimuth direction, and is defined as a function of $\phi$ by the following expression:

$$\Delta R(\phi) = \begin{bmatrix} l_1 l_1 (1-\cos\phi) + \cos\phi & l_2 l_1 (1-\cos\phi) - l_3 \sin\phi & l_3 l_1 (1-\cos\phi) + l_2 \sin\phi \\ l_1 l_2 (1-\cos\phi) + l_3 \sin\phi & l_2 l_2 (1-\cos\phi) + \cos\phi & l_3 l_2 (1-\cos\phi) - l_1 \sin\phi \\ l_1 l_3 (1-\cos\phi) - l_2 \sin\phi & l_2 l_3 (1-\cos\phi) + l_1 \sin\phi & l_3 l_3 (1-\cos\phi) + \cos\phi \end{bmatrix} \quad (2)$$

where "$l=(l_1, l_2, l_3)$" represents a known vector indicating the vertical direction (direction reverse to earth gravity) in the world coordinate system, and $R_{sc}$ represents a 3-by-3 matrix for transforming orientation from the object coordinate system (coordinate system representing the position and orientation of the targeted object 13) to a sensor coordinate system (coordinate system representing the position and orientation of the orientation sensor 14), and is set beforehand as a known value based on a fixed value of relative orientation between the orientation sensor 14 and the targeted object 13.

In step S303, the orientation predicting unit 15 outputs predicted orientation value R* to the data storage unit 17.

In step S304, the orientation predicting unit 15 determines whether to finish the process. If the orientation predicting unit 15 has determined not to finish the process, it proceeds back to step S300.

Figure 4:
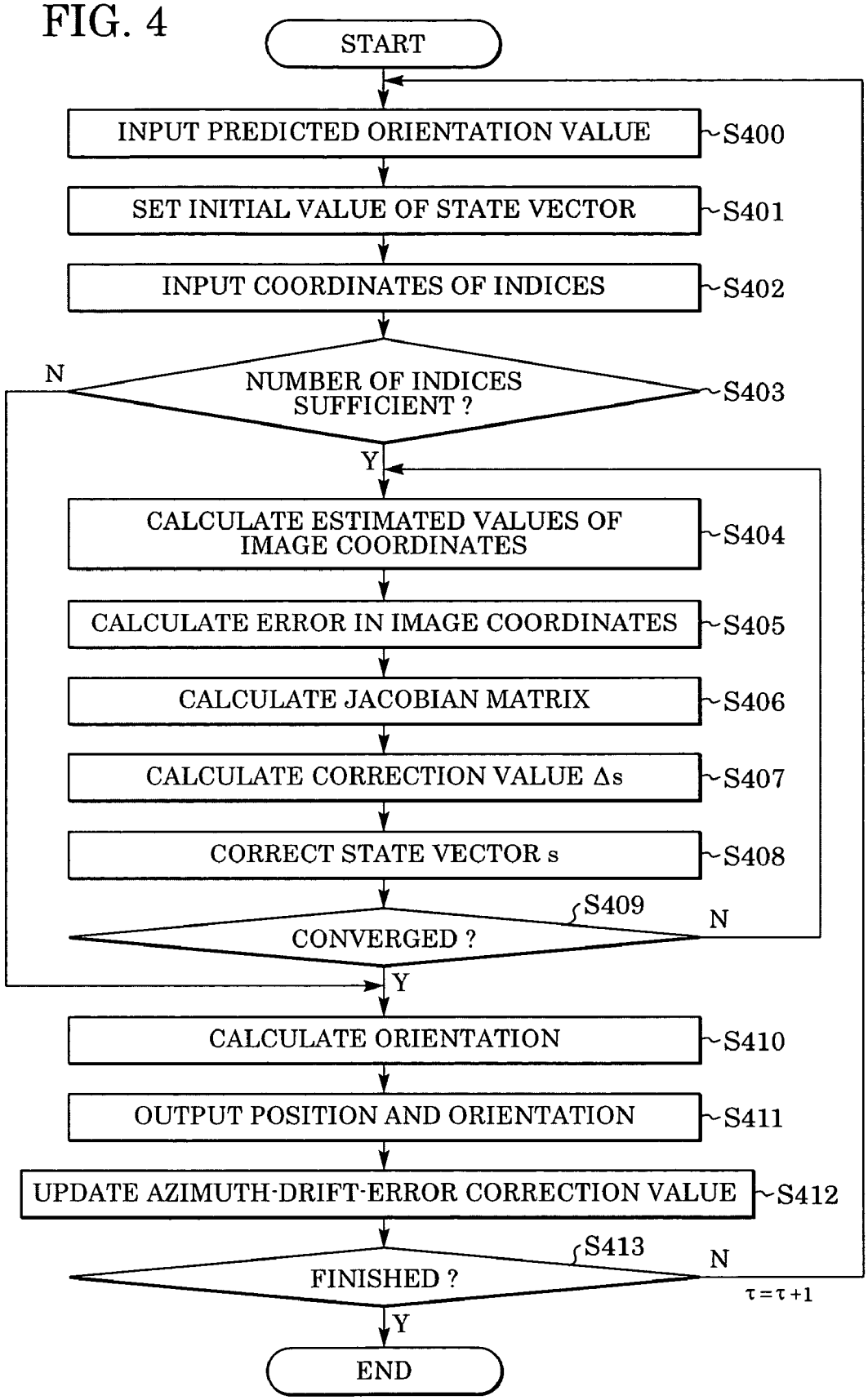
FIG. 4 is a flowchart showing a process which calculates the targeted object shown in FIG. 1 and which is performed such that the software program of the position-orientation calculating unit shown in FIG. 1 is executed by the CPU shown in FIG. 2.

FIG. 4 is a flowchart of a process for calculating parameters representing the position and orientation of the targeted object 13. This process is performed such that the CPU 1001 executes the program of the software corresponding to the position-orientation calculating unit 12. In a stage prior to the following processing, program code in accordance with the flowchart shown in FIG. 4 should be loaded into the RAM 1002 beforehand.

In the position-orientation calculating unit 12, a total of four parameters, that is, the position "$t=[x\ y\ z]^T$" of the targeted object 13 and an update value $\phi$ of the azimuth-drift-error correction value of the orientation sensor 14 are treated as unknown parameters to be calculated. In other words, in the first embodiment, not all of the elements representing the orientation are regarded as unknown. Predicted orientation value R* is assumed to include only a drift error in the azimuth direction. Accordingly, a model is used in which the orientation of the targeted object 13 can be obtained by determining only the update value $\phi$ of the azimuth-drift-error correction value. In the following, the unknown parameters to be found are described by four-value state vector $s=[x\ y\ z\ \phi]^T$.

In step S400, predicted orientation value R* (the output of the orientation predicting unit 15) of the targeted object 13 is input from the data storage unit 17 to the position-orientation calculating unit 12.

In step S401, the position-orientation calculating unit 12 sets $s=[x_{\tau-1}\ y_{\tau-1}\ z_{\tau-1}\ 0]^T$ as an initial value of state vector s. In this expression, $x_{\tau-1}$, $y_{\tau-1}$, and $z_{\tau-1}$ represent the position of the targeted object 13 which is calculated in step S411 in the previous cycle (at time $\tau-1$).

In step S402, sets of the image coordinates of the indices detected by the index detecting unit 11 and object coordinates (coordinate values in the object coordinate system) thereof are input from the data storage unit 17 to the position-orientation calculating unit 12. For example, in the case of FIG. 1, image coordinates $u_c^{P1}$, $u_c^{P2}$, and $u_d^{P2}$, and object coordinates $x_C^{P1}$ and $x_C^{P2}$ corresponding thereto are input.

In step S403, the position-orientation calculating unit 12 determines whether the input index information includes information sufficient for estimating the position and orientation. The result of determination of the position-orientation calculating unit 12 allows the process to branch. Specifically, if the total number of physical indices whose images are input is not less than two, the position-orientation calculating unit 12 proceeds to step S404. If the total number of the indices whose images are input is less than two, the position-orientation calculating unit 12 proceeds to step S410. For example, in the case shown in FIG. 1, the process proceeds to step S404 since two indices are detected (although the number of projected images is three, the number of physical indices is two).

In step S404, for each index $P_{km}$, estimated value $u^{P_{km}*}$ of the image coordinates thereof is calculated by the position-orientation calculating unit 12. Calculation of $u^{P_{km}*}$ is based on the object coordinates (coordinate values in the object coordinate system) $x_C^{P_{km}}$ of each index $P_{km}$ stored beforehand as known information, and a function of the present state vector s, represented by $$u^{P_{km}*} = F_B(x_C^{P_{km}}, s) \quad (3)$$

Specifically, function $F_B()$ consists of the following expression which is represented by $$x_W^{P_{km}} = \begin{bmatrix} x_W^{P_{km}} \\ y_W^{P_{km}} \\ z_W^{P_{km}} \end{bmatrix} = \Delta R(\phi) \cdot R^* \cdot x_C^{P_{km}} + \begin{bmatrix} x \\ y \\ z \end{bmatrix} \quad (4)$$

which finds the coordinates $x_W^{P_{km}}$ of the indices in the world coordinate system from $x_C^{P_{km}}$ and s, the following expression which is represented by $$x_B^{P_{km}} = \begin{bmatrix} x_B^{P_{km}} \\ y_B^{P_{km}} \\ z_B^{P_{km}} \end{bmatrix} = R_{WB}^{-1}(x_W^{P_{km}} - t_{WB}) \quad (5)$$

which finds, based on world coordinate system $x_W^{P_{km}}$, the coordinates $x_B^{P_{km}}$ of the indices in bird's-eye view coordinates (coordinate system of the bird's-eye view cameras 18a, 18b, 18c, and 18d in which an origin and three perpendicularly intersecting axes are defined on each of bird's-eye view cameras), and the following expressing which is represented by $$u^{P_{k_m}^*} = \begin{bmatrix} u_x^{P_{k_m}^*} & u_y^{P_{k_m}^*} \end{bmatrix}^T = \begin{bmatrix} -f_x^B \frac{x_B^{P_{k_m}}}{z_B^{P_{k_m}}} & -f_y^B \frac{y_B^{P_{k_m}}}{z_B^{P_{k_m}}} \end{bmatrix}^T \quad (6)$$

which finds image coordinates $u^{P_{km}*}$ from bird's-eye view coordinates $x_B^{P_{km}}$, where $R^*$ represents the predicted orientation value input in step S400, $\Delta R(\phi)$ represents a rotating matrix that adds rotation by $\phi$ in the azimuth direction, $f_x^B$ and $f_y^B$ respectively represent focal distances in the X axis and Y axis directions of each of the bird's-eye view cameras 18a, 18b, 18c, and 18d, $R_{WB}$ represents a 3-by-3 matrix representing the orientation of each of the bird's-eye view cameras 18a, 18b, 18c, and 18d, and $t_{WB}$ represents a three-dimensional vector representing the position of each of the bird's-eye view cameras 18a, 18b, 18c, and 18d in the world coordinate system, and is stored beforehand as a known value for each of the bird's-eye view cameras 18a, 18b, 18c, and 18d.

In step S405, the position-orientation calculating unit 12 calculates, for each index $P_{km}$, error $\Delta u^{P_{km}}$ between estimated value $u^{P_{km}*}$ and actually measured value $u^{P_{km}}$ of image coordinates on the basis of the following expression:

$$\Delta u^{P_{k_m}} = u^{P_{k_m}} - u^{P_{k_m}^*} \quad (7)$$

In step S406, the position-orientation calculating unit 12 calculates, for each index $P_{km}$, image Jacobian $J_{us}^{P_{km}}$ $(=\partial u/\partial s)$ concerning state vector s. The image Jacobian is, in other words, a 2-by-4 Jacobian matrix having, as elements, solutions obtained by partially differentiating function $F_B$ (represented by expression (3)) with respect to each element of state vector s. Specifically, the position-orientation calculating unit 12 calculates 2-by-3 Jacobian matrix $J_{uxB}^{P_{km}}$ $(=\partial u/\partial x_B)$ having, as elements, solutions obtained by partially differentiating the right side of expression (6) with respect to each element of bird's-eye view camera coordinates $x_B^{P_{km}}$, 3-by-3 Jacobian matrix $J_{xBxW}^{P_{km}}$ $(=\partial x_B/\partial x_W)$ having, as elements, solutions obtained by partially differentiating the right side of expression (5) with respect to each element of world coordinates $x_W^{P_{km}}$, 3-by-4 Jacobian matrix $J_{xWs}^{P_{km}}$ $(=\partial x_W/\partial s)$ having, as elements, solutions obtained by partially differentiating the right side of expression (4) with respect to each element of state vector s. The position-orientation calculating unit 12 calculates $J_{us}^{P_{km}}$ by the following expression:

$$J_{us}^{P_{k_m}} = J_{uxB}^{P_{k_m}} \cdot J_{xBxW}^{P_{k_m}} \cdot J_{xWs}^{P_{k_m}} \quad (8)$$

In step S407, the position-orientation calculating unit 12 calculates correction value $\Delta s$ of state vector s based on the error $\Delta u^{P_{km}}$ and image Jacobian $J_{us}^{P_{km}}$ calculated in steps S405 and S406. Specifically, the position-orientation calculating unit 12 creates 2M-dimensional error vector U in which errors $\Delta u^{P_{km}}$ found for indices $P_{km}$ are vertically arranged, 2M-by-4 matrix $\Theta$ in which image Jacobians $J_{us}^{P_{km}}$ found for indices $P_{km}$ are vertically arranged, and uses the pseudo-inverse matrix $\Theta'$ of 2M-by-4 matrix $\Theta$ to calculates the value represented by $$(9) \quad \Delta s = \Theta' U$$

In the case shown in FIG. 1, since M=3, U is a six-dimensional vector and $\Theta$ is a 6-by-4 matrix.

In step S408, the position-orientation calculating unit 12 updates state vector s by using the correction value $\Delta s$ calculated in step S407 in accordance with the following expression:

$$s + \Delta s \to s \quad (10)$$

In step S409, the position-orientation calculating unit 12 determines whether or not calculation converges by using a criterion such as determining whether or not error vector U is less than a predetermined threshold value, or determining whether or not correction value $\Delta s$ is less than a predetermined threshold value. If the calculation does not converge, the position-orientation calculating unit 12 performs step S404 and the subsequent steps again by using state vector s obtained after correction.

If, in step S409, it is determined that the calculation converges, in step S410, the position-orientation calculating unit 12 calculates the orientation of the targeted object 13 from the obtained state vector s. Specifically, from the state vector s obtained up to the previous step, the position-orientation calculating unit 12 obtains update value $\phi$ of the azimuth-drift-error correction value to calculate orientation R of the targeted object 13 by using the following expression:

$$R = \Delta R(\phi) \cdot R^* \quad (11)$$

Thus, the orientation R of the targeted object 13 is calculated.

In step S411, the position-orientation calculating unit 12 outputs information of the obtained position and orientation of the targeted object 13 to the exterior through the interface 1009. The position-orientation calculating unit 12 also outputs the position t of the targeted object 13 to the data storage unit 17. An output form of the position and orientation may be a set of orientation-representing 3-by-3 matrix R and position-representing three-dimensional vector t, Euler angles obtained by transforming orientation elements, a modeling transformation matrix calculated from a position and orientation, or any of other methods for describing position-and-orientation.

In step S412, by using update value $\phi$ of the azimuth-drift-error correction value obtained in the above calculating steps, the position-orientation calculating unit 12 updates the azimuth-drift-error correction value $\phi^*$ stored in the data storage unit 17 based on the following expression:

$$\phi^* + \phi \to \phi^* \quad (12)$$

In step S413, the position-orientation calculating unit 12 determines whether or not to finish the process. If the position-orientation calculating unit 12 determines not to finish the process, it proceeds to step S400 and executes similar processing on input data in the next frame and the subsequent frames.

The above process measures the position and orientation of the targeted object 13.

Although the above embodiment uses the plurality of bird's-eye view cameras 18a, 18b, 18c, and 18d, it is not always necessary to use the plurality of bird's-eye view cameras 18a, 18b, 18c, and 18d, and it is obvious that, even if a single bird's-eye view camera is used, advantages similar to those in the above embodiment can be obtained. According to the above embodiment, even if convex hulls formed by indices on images are small, the position and orientation of an object can be stably and highly accurately measured. In other words, in the case of using similarly arranged indices, a stable position and orientation can be obtained. In addition, less restriction on arrangement of indices enables measurement of many types of objects. Moreover, bird's-eye view cameras with wide view-angle for covering a broader range can be used, thus maintaining a broad measurement range for movement.

First Modification of First Embodiment

In the above embodiment, update value $\phi$ of the azimuth-drift-error correction value of the orientation sensor is found as an unknown value. However, when the accuracy of the orientation sensor is good, when duration of use is short, or when update value $\phi$ of the azimuth-drift-error correction value can be manually input, parameters to be found by the position-orientation calculating unit 12 may be limited to the position of the targeted object 13. A position-and-orientation measuring apparatus according to a first modification of the first embodiment is intended to measure the position and orientation of an arbitrary targeted object to be measured. This position-and-orientation measuring apparatus is configured by changing the function of the position-orientation calculating unit 12 in the position-and-orientation measuring apparatus according to the first embodiment. The position-and-orientation measuring apparatus according to the first modification and a position-and-orientation measuring method therefor are described below.

In the first modification, all update values $\phi$ in the first embodiment are set to zero. In other words, the position-orientation calculating unit 12 in the first modification, unknown parameters to be found are described by three-valued state vectors $s'=[x\ y\ z]^T$. The position-orientation calculating unit 12 in the first modification may use those obtained by removing terms concerning update value $\phi$ from the processing steps (such as the Jacobian matrices and expression (4)) of the position-orientation calculating unit 12. For example, expression (4) is changed to the following expression:

$$x_W^{P_{k_m}} = \begin{bmatrix} x_W^{P_{k_m}} \\ y_W^{P_{k_m}} \\ z_W^{P_{k_m}} \end{bmatrix} = R^* \cdot x_C^{P_{k_m}} + \begin{bmatrix} x \\ y \\ z \end{bmatrix} \quad (13)$$

According to the position-and-orientation measuring apparatus according to the first modification, the number of unknown parameters is reduced. Thus, it can be expected that the stability of obtained solutions (the position and orientation of the targeted object 13) is further improved.

In order to manually input update value $\phi$ of the azimuth-drift-error correction value, for example, a correction-value-updating unit may be further added to the configuration shown in FIG. 1. The correction-value-updating unit obtains update value $\phi$ of the azimuth-drift-error correction value through an input by an operator, and updates the azimuth-drift-error correction value $\phi^*$ stored in the data storage unit 17 in accordance with expression (12). The correction-value-updating unit may use particular keys of the keyboard 1004 as an interface. For example, the correction-value-updating unit may be set so that a positive-sign '+' key is used to set an update value of +0.1 degrees and a negative sign '−' key is used to set an update value of −0.1 degrees. Even in a form in which, as in the first embodiment, update value $\phi$ of the azimuth-drift-error correction value is derived based on image information, it is obvious that a manual-input correction-value-updating unit can be jointly used.

Second Modification of First Embodiment

In the first embodiment and its first modification, parameters to be found as unknown values are limited to a position and update value $\phi$ of the azimuth-drift-error correction value or only to the position. However, which parameters are to be regarded as unknown do not always need to be fixed. Depending on the characteristics of parameters, by changing parameters which are to be regarded as unknown, if necessary, more preferable estimation of the position and orientation can be found. A position-and-orientation measuring apparatus according to the second modification is intended to measure the position and orientation of an arbitrary targeted object to be measured. The position-and-orientation measuring apparatus according to the second modification is configured by changing the function of the position-orientation calculating unit 12 in the position-and-orientation measuring apparatus according to the first embodiment. The position-and-orientation measuring apparatus according to the second modification and a position-and-orientation measuring method therefor are described below.

A position-orientation calculating unit in the second modification has a combination of the functions of the position-orientation calculating unit 12 in the first embodiment and a position-orientation calculating unit in the first modification of the first embodiment. The position-and-orientation measuring apparatus according to the second modification normally performs processing of the position-orientation calculating unit in the second modification which uses only a position as an unknown parameter. In addition, at regular temporal intervals (e.g., once for every ten seconds (300 frames)), the position-and-orientation measuring apparatus according to the second modification executes processing of the position-orientation calculating unit 12 in the first embodiment which uses the position and update value $\phi$ of the azimuth-drift-error correction value as unknown parameters. It is preferable that temporal intervals for updating the azimuth-drift-error correction value be set depending on a drift characteristic of the position-orientation calculating unit 12, and it is preferable that the temporal intervals be capable of being set by an interactive operation of an operator.

According to the position-and-orientation measuring apparatus according to the second modification, when an orientation sensor by which such accuracy that the azimuth drift error can be ignored is obtainable for a short time is used as the orientation sensor 14, it can be expected that the stability of the obtained solutions are improved while correcting the azimuth drift error.

Third Modification of First Embodiment

In each of the first embodiment and the above modifications, update value $\phi$ of the azimuth-drift-error correction value is found based on image information at a time. The values of the azimuth drift error have high correlation between frames. Thus, by using information of plural frames, the values of the azimuth drift error can be found with higher accuracy. The position-and-orientation measuring apparatus according to the third modification is intended to measure the position and orientation of an arbitrary targeted object to be measured. The position-and-orientation measuring apparatus according to the third modification is configured by changing the function of the position-orientation calculating unit 12 in the first embodiment. The position-and-orientation measuring apparatus according to the third modification and a position-and-orientation measuring method therefor are described below.

Figure 5:
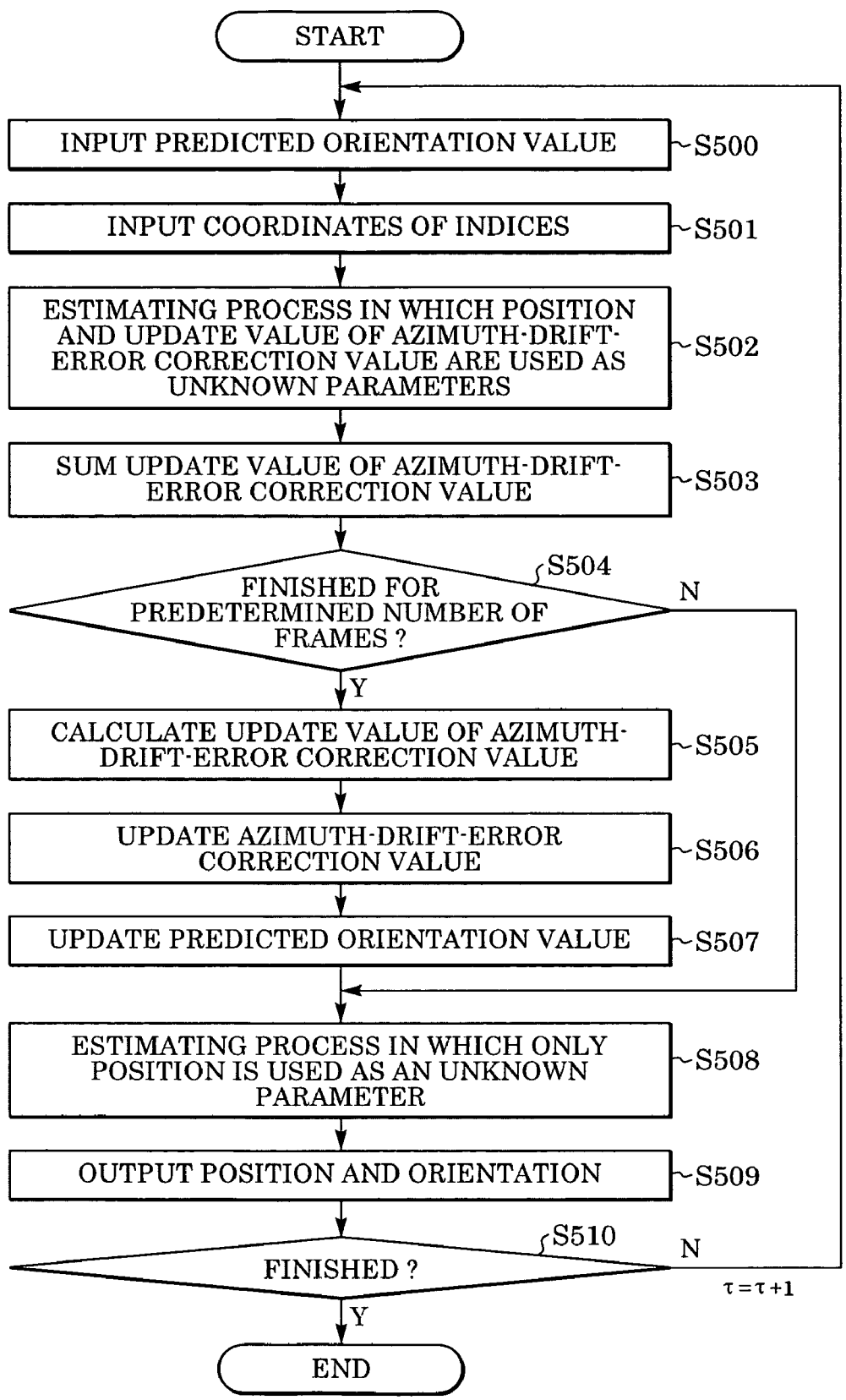
FIG. 5 is a flowchart showing a process which calculates parameters representing the position and orientation of the targeted object shown in FIG. 1 and which is performed such that the software program of the position-orientation detecting unit shown in FIG. 1 is executed by the CPU shown in FIG. 2.

A position-orientation calculating unit 12 in the third modification has a combination of the functions of the position-orientation calculating unit 12 in the first embodiment and the position-orientation calculating unit in the second modification, and executes parameter estimating processes in the first embodiment and the second modification. FIG. 5 is a flowchart showing a process for calculating parameters representing the position and orientation of the targeted object 13. In a stage prior to the following steps, program code in accordance with the flowchart should be loaded into the RAM 1002 beforehand.

In step S500, similarly to step S400 in the first embodiment, predicted orientation value R* of the targeted object 13, that is, the output of the orientation predicting unit 15, is input from the data storage unit 17 to the position-orientation calculating unit 12.

In step S501, similarly to step S402, a set of the image coordinates and world coordinates of the indices detected by the index detecting unit 11 is input from the data storage unit 17 to the position-orientation calculating unit 12.

In step S502, by using, as unknown parameters, the position $t=[x\ y\ z]^T$ of the targeted object 13 and update value $\phi$ of the azimuth-drift-error correction value, the position-orientation calculating unit 12 estimates position T and update value $\phi$ in processing similar to steps S401 and S403 to S409.

In step S503, the position-orientation calculating unit 12 sums the update value $\phi$ of the azimuth-drift-error correction value calculated in step S502 to find sum $\phi_{SUM}$.

In step S504, the position-orientation calculating unit 12 determines whether summation on a predetermined number of frames (e.g., 30 frames) has been performed. If the summation has been performed, the position-orientation calculating unit 12 proceeds to step S505. If not, the position-orientation calculating unit 12 proceeds to step S508.

In step S505, in the position-orientation calculating unit 12, by dividing the sum $\phi_{SUM}$ obtained in step S503 by the number of frames, the average of update values of the azimuth-drift-error correction value is calculated and used as new update value $\phi$ of the azimuth-drift-error correction value. After that, sum $\phi_{SUM}$ is cleared to zero.

In step S506, in the position-orientation calculating unit 12, similarly to step S412 in the first embodiment, by using the update value $\phi$ of the azimuth-drift-error correction value obtained in step S505, the azimuth-drift-error correction value $\phi$* stored in the data storage unit 17 is updated based on expression (12).

In step S507, in the position-orientation calculating unit 12, by using the update value $\phi$ of the azimuth-drift-error correction value obtained in step S505, the orientation of the targeted object 13 is calculated based on expression (11) and the calculated orientation is used as a new predicted orientation value.

In step S508, in the position-orientation calculating unit 12, the position $t=[x\ y\ z]^T$ of the targeted object 13 is used as an unknown parameter and is estimated by processing similar to the first modification.

In step S509, similarly to step S411 in the first embodiment, the position-orientation calculating unit 12 outputs information of the position and orientation of the targeted object 13.

In step S510, the position-orientation calculating unit 12 determines whether to finish the process. If the position-orientation calculating unit 12 has determined not to finish the process, it proceeds back to step S500 and executes similar processing on data input after the next frame (time τ+1).

In the above process, information of plural frames is used to realize improvement in accuracy of an update value of azimuth drift error. Although, in the third modification, the average of update values obtained in frames is used, the median of the update values in the frames may be used, and any of other low-pass filters may be used.

Second Embodiment

A position-and-orientation measuring apparatus according to a second embodiment of the present invention measures the position and orientation of an imaging device. The position-and-orientation measuring apparatus according to the second embodiment and a position-and-orientation measuring method therefor are described below.

Figure 6:
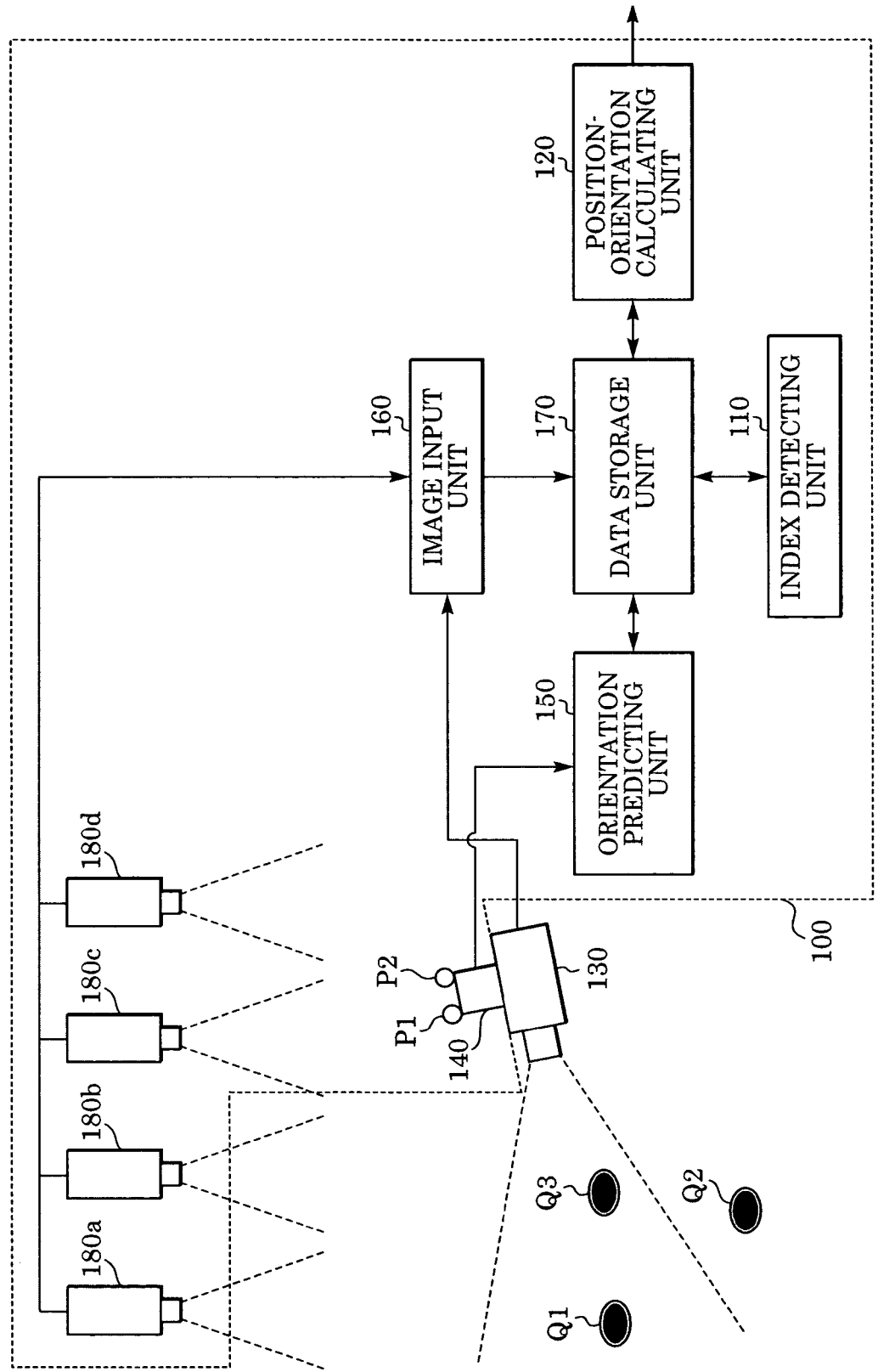
FIG. 6 is a block diagram showing a position-and-orientation measuring apparatus according to a second embodiment of the present invention.

FIG. 6 shows the configuration of the position-and-orientation measuring apparatus according to the second embodiment. As shown in FIG. 6, the position-and-orientation measuring apparatus 100 includes bird's-eye view cameras 180a, 180b, 180c, and 180d, an image input unit 160, a data storage unit 170, an index detecting unit 110, an orientation sensor 140, an orientation predicting unit 150, and a position-orientation calculating unit 120. The position-and-orientation measuring apparatus 100 is connected to an imaging device 130.

At a plurality of positions in a real space, a plurality of indices $Q_k$ (k=1, ..., $K_Q$) (hereinafter referred to as "subjective viewpoint indices") whose positions $x_W^{Qk}$ in the world coordinate system are known are disposed as indices to be observed by the imaging device 130. Here the world coordinate system is defined by an origin and three perpendicularly intersecting axes in the scene. At a plurality of positions on the orientation sensor 140 and/or the imaging device 130, indices $P_k$ (k=1, ..., $K_p$) (hereinafter referred to as "bird's-eye view indices") in which positions $x_C^{Pk}$ in a object coordinate system are known are set to be observed by the bird's-eye view cameras 180a, 180b, 180c, and 180d. Here the object coordinate system is defined by an origin and three perpendicularly intersecting axes on the imaging device 130.

It is preferable that these indices be disposed so that, when the imaging device 130 is positioned at each point in a measurement range in which a position and orientation are to be measured, the total number of subjective viewpoint indices observed in a subjective viewpoint image acquired by the imaging device 130 and the (physical) bird's-eye view indices observed in bird's-eye view images acquired by the bird's-eye view cameras 180a, 180b, 180c, and 180d is at least two. In the state shown in FIG. 6, three subjective viewpoint indices $Q_1$, $Q_2$, and $Q_3$ and two bird's-eye view indices $P_1$ and $P_2$ are set, and, among the three subjective viewpoint indices $Q_1$, $Q_2$, and $Q_3$, two subjective viewpoint indices $Q_1$ and $Q_3$ are included in a field of view of the imaging device 130. The bird's-eye view index $P_1$ is included in a field of view of the bird's-eye view camera 180c, and the bird's-eye view index $P_2$ is included in fields of view of the bird's-eye view cameras 180c and 180d.

Subjective viewpoint indices $Q^k$ and bird's-eye view indices $P^k$ may be formed by, for example, spherical or circular markers having different colors, or feature points such as natural features having different texture features. Subjective viewpoint indices $Q^k$ and bird's-eye view indices $P^k$ may have any form if the image coordinates of projected images on a captured image can be detected and each index can be identified in some manner. Both subjective viewpoint indices $Q^k$ and bird's-eye view indices $P^k$ may be deliberately set or may have natural shapes which are not deliberately set.

An image (hereinafter referred to as a "subjective viewpoint image") output by the imaging device 130 is input to the position-and-orientation measuring apparatus 100.

The bird's-eye view cameras 180a, 180b, 180c, and 180d are fixedly disposed at such positions that, when the imaging device 130 is positioned in the measurement range, one of the bird's-eye view cameras 180a, 180b, 180c, and 180d can capture the image of the imaging device 130. The position and orientation of each of the bird's-eye view cameras 180a, 180b, 180c, and 180d in the world coordinate system should be stored as known values in the data storage unit 170 beforehand. Images (hereinafter referred to as "bird's-eye view images") output by the bird's-eye view cameras 180a, 180b, 180c, and 180d are input to the image input unit 160.

The subjective viewpoint image and bird's-eye view images input to the position-and-orientation measuring apparatus 100 are converted into digital data by the image input unit 160. The image input unit 160 stores the digital data in the data storage unit 170.

The orientation sensor 140 is mounted on the imaging device 130. The orientation sensor 140 measures its present orientation and outputs the measured orientation to the orientation predicting unit 150. The orientation sensor 140 is a sensor unit based on angular rate sensors such as gyroscopes, and is formed of, for example, a TISS-5-40 made by Tokimec Inc. in Japan, or an InertiaCube2 made by InterSense Inc. in the United States. A measured orientation value obtained by the above sensor is an orientation which differs from the actual orientation and which has an error. The above orientation sensor has, as components, some acceleration sensors for observing the gravitational direction of the earth, and has a function of canceling accumulation of drift error in the direction of an angle of inclination. Thus, the above orientation sensor has a property of producing no drift error in the direction of the angle of inclination (pitch angle and roll angle). In other words, the above sensor has drift error that is accumulated with the lapse of time concerning an angle around the gravitational axis, that is an azimuth (yaw) angle direction.

The orientation predicting unit 150 receives azimuth-drift-error correction value $\phi$ from the data storage unit 170, predicts the orientation of the imaging device 130 by correcting the measured orientation value input from the orientation sensor 140, and outputs the predicted orientation to the data storage unit 170.

The subjective viewpoint image and the bird's-eye view images are input from the data storage unit 170 to the index detecting unit 110, and the image coordinates of indices photographed in the input images are detected. For example, when the indices are formed of markers having different colors, regions that correspond to the markers' colors are detected from the bird's-eye view images, and their barycentric positions are used as detected coordinates of the indices. When the indices are formed of feature points having different texture features, the positions of the indices are detected by implementing template matching based on template images for the indices which are stored beforehand as known information. It is possible to limit a search range by predicting the position of each index in the image based on a calculated value of the position of the imaging device 130 which is the output of the position-orientation calculating unit 120 and stored in the data storage unit 170, and a predicted value of the orientation of the imaging device 130 which is the output of the orientation predicting unit 150 and also stored in the data storage unit 170. By this option, the calculation load required for index detection can be reduced and false detection and false identification of indices can be reduced.

The index detecting unit 110 outputs the image coordinates of the detected indices and their identifiers to the data storage unit 170. In the following, by using identifier n (n=1, . . . , N) assigned to each detected index, the indices detected in the subjective viewpoint image are represented by $Q_{kn}$. In addition, by using camera identifier x (x=a, b, c, and d) and identifier m (m=1, . . . , $M_x$) assigned to each detected index, the indices detected in the bird's-eye view images are represented by $P_{kxm}$. The letter N represents the number of indices detected in the subjective viewpoint image, and the letter $M_x$ represents the number of indices detected in each of the bird's-eye view images. The letter M represents the sum of indices detected in the bird's-eye view images. In addition, the image coordinates of detected indices $Q_{kn}$ are represented by $u^{Qkn}$, and the image coordinates of detected indices $P_{kxm}$ are represented by $u_a^{Pkam}$, $U_b^{Pkbm}$, $U_c^{Pkcm}$, and $u_d^{Pkdm}$ depending on the identifiers of bird's-eye view cameras that capture the images. For example, in the case shown in FIG. 6, N=2, $M_a$=0, $M_b$=0, $M_c$=2, $M_d$=1, and M=3. Accordingly, index identifiers ($k_1$=1, $k_2$=3, $k_{c1}$=1, $k_{c2}$=2, and $k_{d1}$=2) the identifiers of bird's-eye view cameras that captures images of the indices, and image coordinates ($u^{Qk1}$, $u^{Qk2}$, $u_c^{Pkc1}$, $u_c^{Pkc2}$, and $u_d^{Pkd1}$) corresponding thereto are output.

The predicted value of the orientation of the imaging device 130, sets of the image coordinates $u^{Qkn}$ and world coordinates $x_W^{Qkn}$ of the subjective viewpoint indices detected by the index detecting unit 110 and, sets of the image coordinates $u^{Pkam}$, $u^{Pkbm}$, $u^{Pkcm}$, and $u^{Pkdm}$ of the bird's-eye view cameras and object coordinates (coordinate values in the object coordinate system) $x_C^{Pkam}$, $x_C^{Pkbm}$, $x_C^{Pkcm}$, and $x^{cP}_{kdm}$ are input from the data storage unit 170 to the position-orientation calculating unit 120. The position-orientation calculating unit 120 calculates the position and orientation of the imaging device 130 based on the above information and outputs the calculated position and orientation through an interface (not shown). In addition, the position-orientation calculating unit 120 outputs the calculated position to the data storage unit 170, and updates an azimuth-drift-error correction value stored in the data storage unit 170 by using an update value of the azimuth-drift-error correction value of the orientation sensor 140, which is derived in the process of calculating the position and orientation of the imaging device 130.

The data storage unit 170 stores various types of data, such as an azimuth-drift-error correction value, images input from the image input unit 160, a predicted value of the orientation input from the orientation predicting unit 150, a calculated position value input from the position-orientation calculating unit 120, the image coordinates and identifiers of indices input from the index detecting unit 110, the world coordinates of subjective viewpoint indices, which are known values, the object coordinates (coordinate values in the object coordinate system) of bird's-eye view indices, and camera parameters of the bird's-eye view cameras 180a, 180b, 180c, and 180d. The various types of data are input/output from/to the data storage unit 170, if necessary.

Each of the image input unit 160, data storage unit 170, index detecting unit 110, orientation predicting unit 150, and position-orientation calculating unit 120, shown in FIG. 6, may be treated as separate devices. Alternatively, by installing each unit as software into one or a plurality of computers, and using the CPU of each computer to execute the software, the function of the unit may be realized. In the second embodiment, the image input unit 160, the data storage unit 170, the index detecting unit 110, the orientation predicting unit 150, and the position-orientation calculating unit 120 are treated as software to be executed by a single computer. The basic configuration of a computer that executes each of the image input unit 160, data storage unit 170, index detecting unit 110, orientation predicting unit 150, and position-orientation calculating unit 120 as software is shown by a block diagram in FIG. 1.

Figure 7:
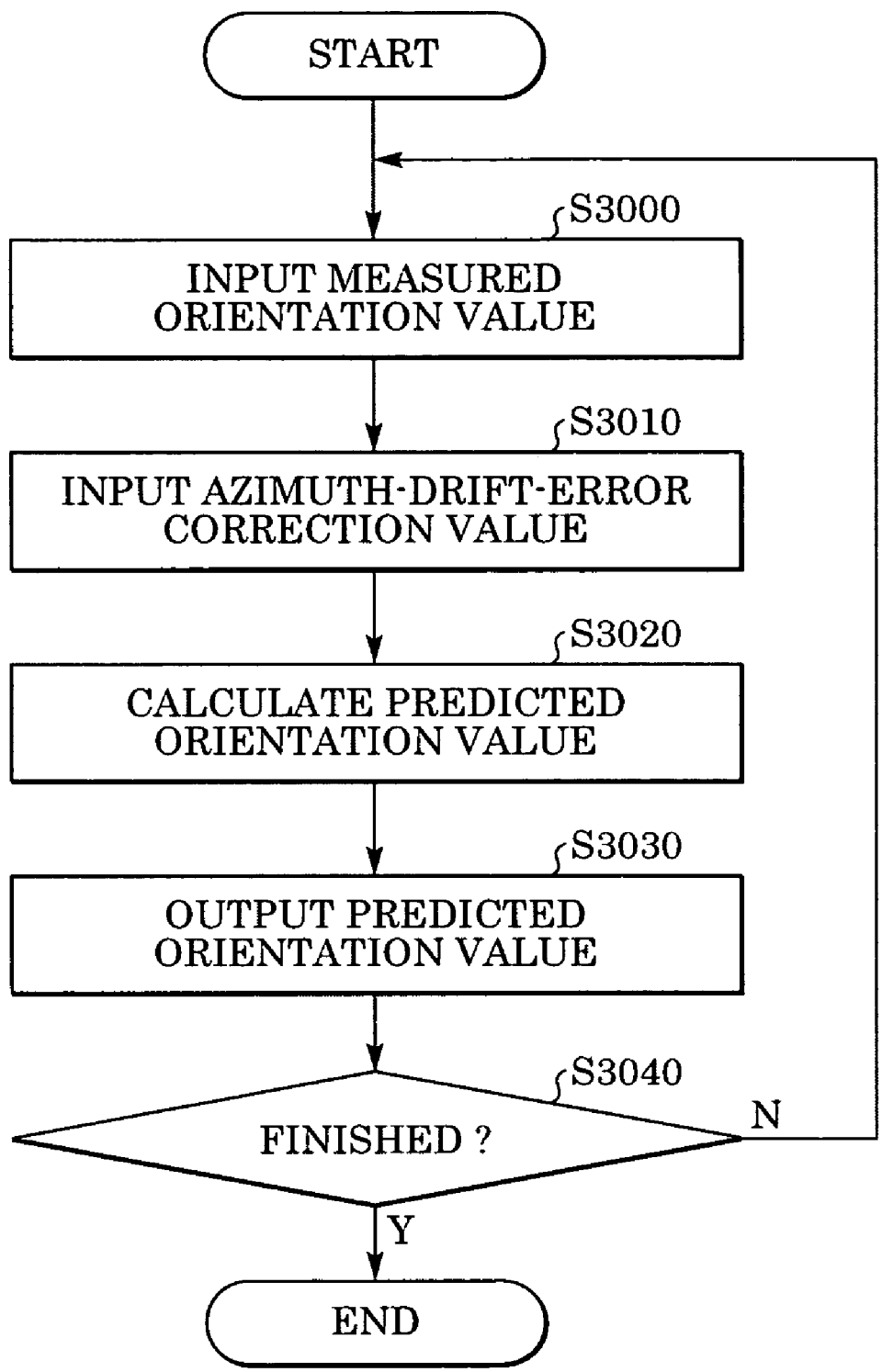
FIG. 7 is a flowchart showing a process which calculates the imaging device shown in FIG. 6 and which is performed such that the software program of the orientation predicting unit shown in FIG. 6 is executed by the CPU shown in FIG. 2.

FIG. 7 is a flowchart showing a process of the orientation predicting unit 150. This process is performed such that the CPU 1001 executes the software program of the orientation predicting unit 150. In a stage prior to implementation of the following process, program code in accordance with the flowchart should be loaded into the RAM 1002 beforehand.

There are various methods for representing orientation. In the second embodiment, the orientation is represented by 3-by-3 rotating matrix R.

In step S3000, measured orientation value R# (# represents a sensor-measured value) is input from the orientation sensor 140 to the orientation predicting unit 150.

In step S3010, azimuth-drift-error correction value $\phi^*$ is input from the data storage unit 170 to the orientation predicting unit 150.

In step S3020, by subjecting measured orientation value R# (representing the orientation of the orientation sensor 140) to a transformation from the orientation of the orientation sensor 140 to that of the imaging device 130, and correcting drift error based on the azimuth-drift-error correction value $\phi^*$, the orientation predicting unit 150 calculates the orientation of the imaging device 130 as a predicted orientation value R*.

$$R^* = \Delta R(\phi^*) \cdot R\# \cdot R_{SC} \quad (14)$$

where $\Delta R(\phi)$ represents a rotating matrix that adds rotation by $\phi$ in the azimuth direction, and is defined as a function of $\phi$ by the following expression:

$$\Delta R(\phi) = \begin{bmatrix} l_1 l_1 (1-\cos\phi) + \cos\phi & l_2 l_1 (1-\cos\phi) - l_3 \sin\phi & l_3 l_1 (1-\cos\phi) + l_2 \sin\phi \\ l_1 l_2 (1-\cos\phi) + l_3 \sin\phi & l_2 l_2 (1-\cos\phi) + \cos\phi & l_3 l_2 (1-\cos\phi) - l_1 \sin\phi \\ l_1 l_3 (1-\cos\phi) - l_2 \sin\phi & l_2 l_3 (1-\cos\phi) + l_1 \sin\phi & l_3 l_3 (1-\cos\phi) + \cos\phi \end{bmatrix} \quad (15)$$

where "$l=(l_1, l_2, l_3)$" represents a known vector indicating the vertical direction (direction reverse to earth gravity) in the world coordinate system, and $R_{sc}$ represents a 3-by-3 matrix for transforming orientation from the object coordinate system (coordinate system representing the position and orientation of the imaging device 130) to a sensor coordinate system (coordinate system representing the position and orientation of the orientation sensor 140), and is set beforehand as a known value based on a fixed value of relative orientation between the orientation sensor 140 and the imaging device 130.

In step S3030, the orientation predicting unit 150 outputs predicted orientation value R* to the data storage unit 170.

In step S3040, the orientation predicting unit 150 determines whether to finish the process. If the orientation predicting unit 150 has determined not to finish the process, it proceeds back to step S3000.

Figure 8:
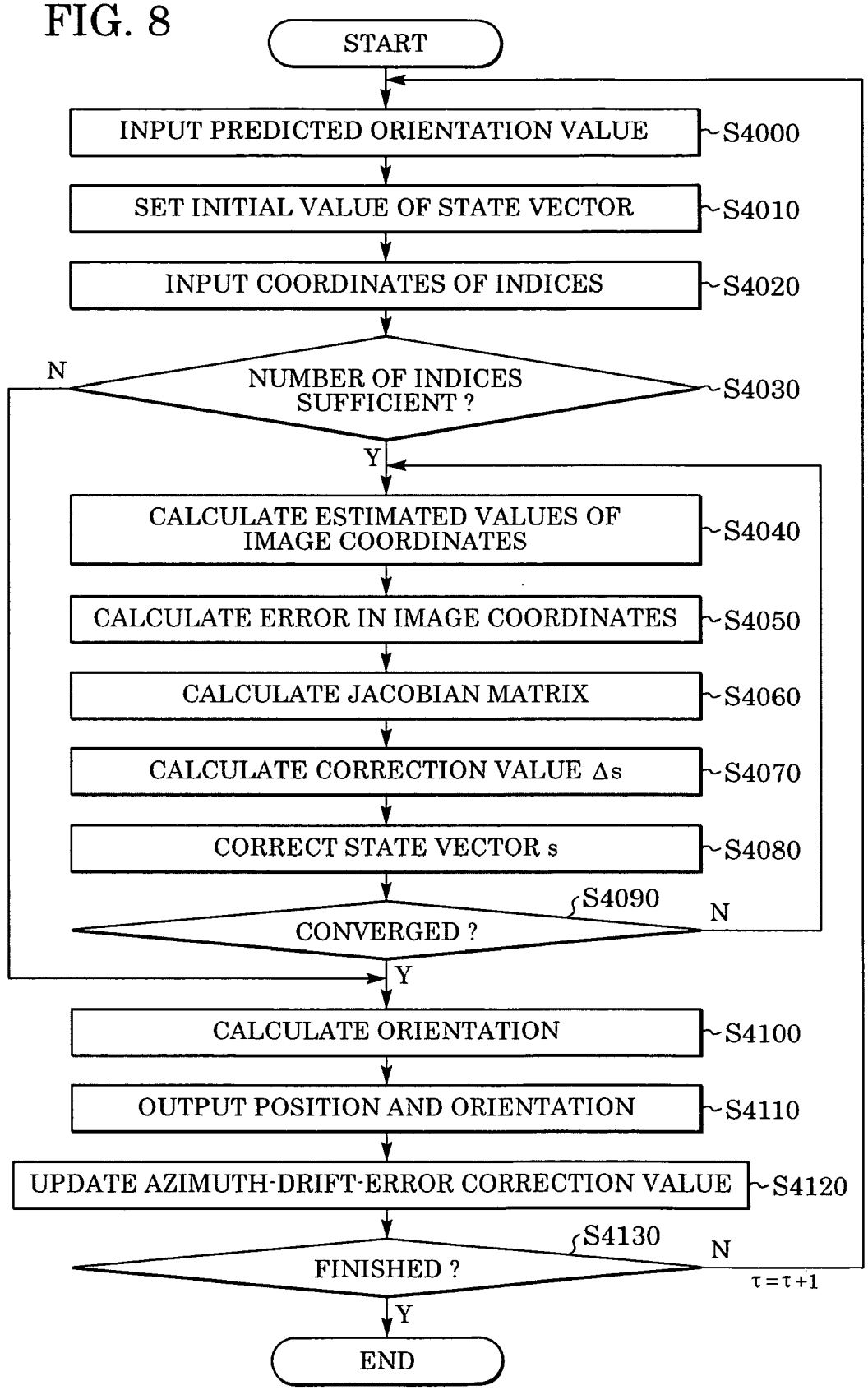
FIG. 8 is a flowchart showing a process which calculates parameters representing the position and orientation of the imaging device shown in FIG. 6 and which is performed such that the software program of the position-orientation calculating unit shown in FIG. 6 is executed by the CPU shown in FIG. 2.

FIG. 8 is a flowchart showing a process for calculating parameters representing the position and orientation of the imaging device 130. This process is performed such that the CPU 1001 executes the software program of the position-orientation calculating unit 120. In a stage prior to implementation of the following process, program code in accordance with the above flowchart should be loaded into the RAM 1002 beforehand.

In the position-orientation calculating unit 120, a total of four parameters, that is, the positions "$t=[x\ y\ z]^T$" of the imaging device 130 and an update value $\phi$ of the azimuth-drift-error correction value of the orientation sensor 140 are treated as unknown parameters to be calculated. In other words, in the second embodiment, not all of the elements representing the orientation are regarded as unknown. Predicted orientation value R* is assumed to include only a drift error in the azimuth direction. Accordingly, a model is used in which the orientation of the imaging device 130 can be obtained by determining only the update value $\phi$ of the azimuth-drift-error correction value. In the following, the unknown parameters to be found are described by four-value state vector $s=[x\ y\ z\ \phi]^T$.

In step S4000, predicted orientation value R* (the output of the orientation predicting unit 150) of the imaging device 130 is input from the data storage unit 170 to the position-orientation calculating unit 120.

In step S4010, the position-orientation calculating unit 120 sets $s=[x_{\tau-1}\ y_{\tau-1}\ z_{\tau-1}\ 0]^T$ as an initial value of state vector s. In this expression, $x_{\tau-1}$, $y_{\tau-1}$, and $z_{\tau-1}$ represent the position of the imaging device 130 which is calculated in step S4110 in the previous cycle (at time $\tau-1$).

In step S4020, a set of the image coordinates of the subjective viewpoint indices detected by the index detecting unit 110 and the world coordinates thereof, and sets of the image coordinates of the bird's-eye view indices detected by the index detecting unit 110 and object coordinates (coordinate values in the object coordinate system) thereof are input from the data storage unit 170 to the position-orientation calculating unit 120. For example, in the case shown in FIG. 6, the image coordinates $u^{Q1}$ and $u^{Q3}$ of the subjective viewpoint indices and world coordinates $x_W^{Q1}$ and $x_W^{Q3}$ corresponding thereto, and the image coordinates $u_c^{P1}$, $u_c^{P2}$, and $u_d^{P2}$ and object coordinates $x_C^{P1}$ and $x_C^{P2}$ corresponding thereto are input.

In step S4030, the position-orientation calculating unit 120 determines whether the input index information includes information sufficient for estimating the position and orientation. The result of determination of the position-orientation calculating unit 120 allows the process to branch. Specifically, if the total number of physical indices whose images are input is not less than two, the position-orientation calculating unit 120 proceeds to step S4040. If the total number of the indices whose images are input is less than two, the position-orientation calculating unit 120 proceeds to step S4100. For example, in the case shown in FIG. 8, two subjective viewpoint indices and two bird's-eye view indices (although the number of projected images is three, the number of physical indices is two) are detected, so that the total number is four. Accordingly, the process proceeds to step S4040.

In step S4040, based on present state vector s, the position-orientation calculating unit 120 calculates estimated value of the image coordinates of each of the subjective viewpoint indices $Q_{kn}$ and the bird's-eye view indices $P_{km}$ input in step S4020.

Estimated value $u^{Qkn*}$ of image coordinates of each subjective viewpoint index $Q_{kn}$ is calculated by using the follow ing function of world coordinates $x_W^{Q_{kn}}$ for each $Q_{kn}$ and present state vector s:

$$u^{Q_{kn}^*} = F_C(x_W^{Q_{kn}}, s) \qquad (16)$$

Specifically, function $F_C(\ )$ consists of the following expression which is represented by $$x_C^{Q_{kn}} = \begin{bmatrix} x_C^{Q_{kn}} \\ y_C^{Q_{kn}} \\ z_C^{Q_{kn}} \end{bmatrix} = (\Delta R(\phi) \cdot R^*)^{-1} \left( x_W^{Q_{kn}} - \begin{bmatrix} x \\ y \\ z \end{bmatrix} \right) \qquad (17)$$

which finds coordinates $x_C^{Q_{kn}}$ in the object coordinate system (the coordinate system defined by the imaging device 130) based on world coordinates $x_W^{Q_{kn}}$ and state vector s, and the following expression which is represented by $$u^{Q_{kn}^*} = \begin{bmatrix} u_x^{Q_{kn}^*} & u_y^{Q_{kn}^*} \end{bmatrix}^T = \begin{bmatrix} -f_x^C \dfrac{x_C^{Q_{kn}}}{z_C^{Q_{kn}}} & -f_y^C \dfrac{y_C^{Q_{kn}}}{z_C^{Q_{kn}}} \end{bmatrix}^T \qquad (18)$$

which finds image coordinates $u^{Q_{kn}^*}$ from $x_C^{Q_{kn}}$, where $R^*$ represents the predicted orientation value input in step S4000, $\Delta R(\phi)$ represents a rotating matrix that adds rotation by $\phi$ in the azimuth direction, $f_x^C$ and $f_y^C$ respectively represent focal distances in the X axis and Y axis directions of the imaging device 130, which are stored as known values beforehand.

Estimated value $u^{P_{km}*}$ of image coordinates of each bird's-eye view index $P_{km}$ is calculated by using the following function of object coordinates (coordinate values in the object coordinate system) $x_C^{P_{km}}$ for each $P_{km}$ and state vector s.

$$u^{P_{km}^*} = F_B(x_C^{P_{km}}, s) \qquad (19)$$

Specifically, function $F_B(\ )$ consists of the following expression which is represented by $$x_W^{P_{km}} = \begin{bmatrix} x_W^{P_{km}} \\ y_W^{P_{km}} \\ z_W^{P_{km}} \end{bmatrix} = \Delta R(\phi) \cdot R^* \cdot x_C^{P_{km}} + \begin{bmatrix} x \\ y \\ z \end{bmatrix} \qquad (20)$$

which finds the coordinate $x_W^{P_{km}}$ of the index in the world coordinates from $x_C^{P_{km}}$ and state vector s, the following expression which is represented by $$x_B^{P_{km}} = \begin{bmatrix} x_B^{P_{km}} \\ y_B^{P_{km}} \\ z_B^{P_{km}} \end{bmatrix} = R_{WB}^{-1}(x_W^{P_{km}} - t_{WB}) \qquad (21)$$

which finds, from world coordinate system $x_W^{P_{km}}$, coordinate $x_B^{P_{km}}$ of the index in the bird's-eye view camera coordinates (coordinate system of the bird's-eye view cameras 180a, 180b, 180c, and 180d in which an origin and three perpendicularly intersecting axes are defined on each of bird's-eye view cameras), and the following expression:

$$u^{P_{km}^*} = \begin{bmatrix} u_x^{P_{km}^*} & u_y^{P_{km}^*} \end{bmatrix}^T = \begin{bmatrix} -f_x^B \dfrac{x_B^{P_{km}}}{z_B^{P_{km}}} & -f_y^B \dfrac{y_B^{P_{km}}}{z_B^{P_{km}}} \end{bmatrix}^T \qquad (22)$$

which finds image coordinates $u^{P_{km}*}$ from $x_B^{P_{km}}$, where $f_x^B$ and $f_y^B$ respectively represent focal distances in the X axis and Y axis directions of each of the bird's-eye view cameras 180a, 180b, 180c, and 180d, $R_{WB}$ represents a 3-by-3 matrix representing the orientation of each of the bird's-eye view cameras 180a, 180b, 180c, and 180d, and $t_{WB}$ which represents a three-dimensional vector representing the position of each of the bird's-eye view cameras 180a, 180b, 180c, and 180d in the world coordinate system, and which is stored beforehand as a known value for each of the bird's-eye view cameras 180a, 180b, 180c, and 180d.

In step S4050, for each of the indices (the subjective viewpoint indices and the bird's-eye view indices), the position-orientation calculating unit 120 calculates errors $\Delta u^{Q_{kn}}$ and $\Delta u^{P_{km}}$ between an estimated value and an actually measured value by using the following expressions:

$$\Delta u^{Q_{kn}} = u^{Q_{kn}} - u^{Q_{kn}^*} \qquad (23)$$

$$\Delta u^{P_{km}} = u^{P_{km}} - u^{P_{km}^*} \qquad (24)$$

In step S4060, for each of the indices (the subjective viewpoint indices and the bird's-eye view indices), the position-orientation calculating unit 120 calculates an image Jacobian concerning state vector s. The image Jacobian of subjective viewpoint index $Q_{kn}$ is 2-by-4 Jacobian matrix $J_{us}^{Q_{kn}}$ ($=\partial u/\partial s$) having, as elements, solutions obtained by partially differentiating function $f_c(\ )$ with respect to each element of state vector s. Specifically, after finding 2-by-3 Jacobian matrix $J_{ux}^{Q_{kn}}$ ($=\partial u/\partial x$) having, as elements, solutions obtained by partially differentiating the right side of expression (18) with respect to each element of $x_C^{Q_{kn}}$, and 3-by-4 Jacobian matrix $J_{xs}^{Q_{kn}}$ ($=\partial x/\partial s$) having, as elements, solutions obtained by partially differentiating the right side of expression (17) with respect to each element of state vector s, the image Jacobian of subjective viewpoint index $Q_{kn}$ is calculated by using the above matrices based on the following expression:

$$J_{us}^{Q_{kn}} = J_{ux}^{Q_{kn}} \cdot J_{xs}^{Q_{kn}} \qquad (25)$$

The image Jacobian of birds-eye view index $P_{km}$ is 2-by-4 Jacobian matrix $J_{us}^{P_{km}}$ ($=\partial u/\partial s$) having, as elements, solutions obtained by partially differentiating the function $F_B(\ )$ in expression (19) with respect to each element of state vector s. After finding 2-by-3 Jacobian matrix $J_{ux_B}^{P_{km}}$ ($=\partial u/\partial x_B$) having, as elements, solutions obtained by partially differentiating the right side of expression (22) with respect to each element of bird's-eye view camera coordinates $x_B^{P_{km}}$, 3-by-3 Jacobian matrix $J_{x_Bx_W}^{P_{km}}$ ($=\partial x_B/\partial x_W$) having, as elements, solutions obtained by partially differentiating the right side of expression (21) with respect to each element of world coordinates $x_W^{Pkm}$, and 3-by-4 Jacobian matrix $J_{x_Ws}^{Pkm}(=\partial x_W/\partial s)$ having, as elements, solutions obtained by partially differentiating the right side of expression (20) with respect to each element of state vector s, the image Jacobian of bird's-eye view index $P_{km}$ is calculated by using the above matrices based on the following expression:

$$J_{us}^{P_{km}} = J_{ux_B^P}^{P_{km}} \cdot J_{x_B^Pxw}^{P_{km}} \cdot J_{xws}^{P_{km}} \quad (26)$$

In step S4070, based on the error Δu and image Jacobian $J_{us}$ calculated for each index in steps S4050 and S4060, the position-orientation calculating unit 120 calculates correction value Δs of state vector s on the basis of the following expression:

$$\Delta s = \Theta' U \quad (27)$$

where U represents a 2(N+M)-dimensional error vector which is represented by $$U = \begin{bmatrix} \Delta u^{Q_{k_1}} \\ \vdots \\ \Delta u^{Q_{k_N}} \\ \Delta u^{P_{k_{a_1}}} \\ \vdots \\ \Delta u^{P_{k_{a_{Ma}}}} \\ \vdots \\ \Delta u^{P_{k_{d_1}}} \\ \vdots \\ \Delta u^{P_{k_{d_{Md}}}} \end{bmatrix} \quad (28)$$

in which errors Δu found for the indices (the subjective viewpoint indices and the bird's-eye view indices) are vertically arranged, and Θ represents a 2(N+M)-by-4 matrix which is represented by $$\Theta = \begin{bmatrix} J_{us}^{Q_{k_1}} \\ \vdots \\ J_{us}^{Q_{k_N}} \\ J_{us}^{P_{k_{a_1}}} \\ \vdots \\ J_{us}^{P_{k_{a_{Ma}}}} \\ \vdots \\ J_{us}^{P_{k_{d_1}}} \\ \vdots \\ J_{us}^{P_{k_{d_{Md}}}} \end{bmatrix} \quad (29)$$

in which image Jacobians found for the indices (the subjective viewpoint indices and the bird's-eye view indices) are vertically arranged. Here Θ' indicates pseudo-inverse matrix of Θ. In the case shown in FIG. 6, N=2 and M=3. Thus, U is a ten-dimensional vector and Θ is a 10-by-4 vector.

In step S4080, by using the correction value Δs calculated in step S4070, the position-orientation calculating unit 120 corrects state vector s in accordance with the following expression, and uses the obtained value as a new estimated value.

$$s + \Delta s \rightarrow s \quad (30)$$

In step S4090, the position-orientation calculating unit 120 determines whether or not calculation converges by using a criterion such as determining whether or not error vector U is less than a predetermined threshold value, or determining whether or not correction value Δs is less than a predetermined threshold value. If the calculation does not converge, the position-orientation calculating unit 120 performs step S4040 and the subsequent steps again by using state vector s obtained after correction.

If, in step S4090, it is determined that the calculation converges, in step S4100, the position-orientation calculating unit 120 calculates the orientation of the imaging device 130 from the obtained state vector s. Specifically, from the state vector s obtained up to the previous step, the position-orientation calculating unit 120 obtains update value φ of the azimuth-drift-error correction value to calculate orientation R of the imaging device 130 by using the following expression:

$$R = \Delta R(\phi) \cdot R^* \quad (31)$$

In step S4110, the position-orientation calculating unit 120 outputs information of the obtained position and orientation of the imaging device 130 to the exterior through the interface 1009. The position-orientation calculating unit 120 also outputs the position t of the imaging device 130 to the data storage unit 170. An output form of the position and orientation may be a set of orientation-representing 3-by-3 matrix R and position-representing three-dimensional vector t, Euler angles obtained by transforming orientation elements, a viewing transformation matrix calculated from a position and orientation, or any of other method for describing position-and-orientation.

In step S4120, by using the update value φ of the azimuth-drift-error correction value obtained in the above calculating steps, the position-orientation calculating unit 120 updates the azimuth-drift-error correction value φ* stored in the data storage unit 170 based on the following expression:

$$\phi^* + \phi \rightarrow \phi^* \quad (32)$$

In step S4130, the position-orientation calculating unit 120 determines whether or not to finish the process. If the position-orientation calculating unit 120 determines not to finish the process, it proceeds to step S4000 and executes similar processing on input data in the next frame and the subsequent frames.

The above process measures the position and orientation of the imaging device 130.

According to the position-and-orientation measuring apparatus according to the second embodiment, if the sum of the number of indices observed on a subjective viewpoint image and the number of indices observed on bird's-eye view images is at least two, the position and orientation of the imaging device 130 can be measured. Accordingly, even if the subjective viewpoint image is obstructed (by hand or the like), the position and orientation of the imaging device 130 can be measured based on bird's-eye view image information (observation of at least two bird's-eye view indices). Conversely, even in such a situation that all bird's-eye view indices are completely obstructed, the position and orientation of the imaging device 130 can be measured based on subjective viewpoint image information (observation of at least two subjective viewpoint indices).

Although, in the second embodiment, the plurality of bird's-eye view cameras 180*a*, 180*b*, 180*c*, and 180*d* are used, they are not always required. Even in the case of using a single bird's-eye view camera, it is obvious that advantages similar to those in the second embodiment can be obtained.

First Modification of Second Embodiment

The second embodiment is intended to measure the position and orientation of an imaging device that moves in a space. Unlike the second embodiment, a position-and-orientation measuring apparatus according to a first modification of the second embodiment is intended to measure the position and orientation of an arbitrary targeted object. This position-and-orientation measuring apparatus is configured by adding a subjective viewpoint camera to the position-and-orientation measuring apparatus according to the second embodiment. The position-and-orientation measuring apparatus according to the first modification of the second embodiment and a method therefor are described below.

Figure 9:
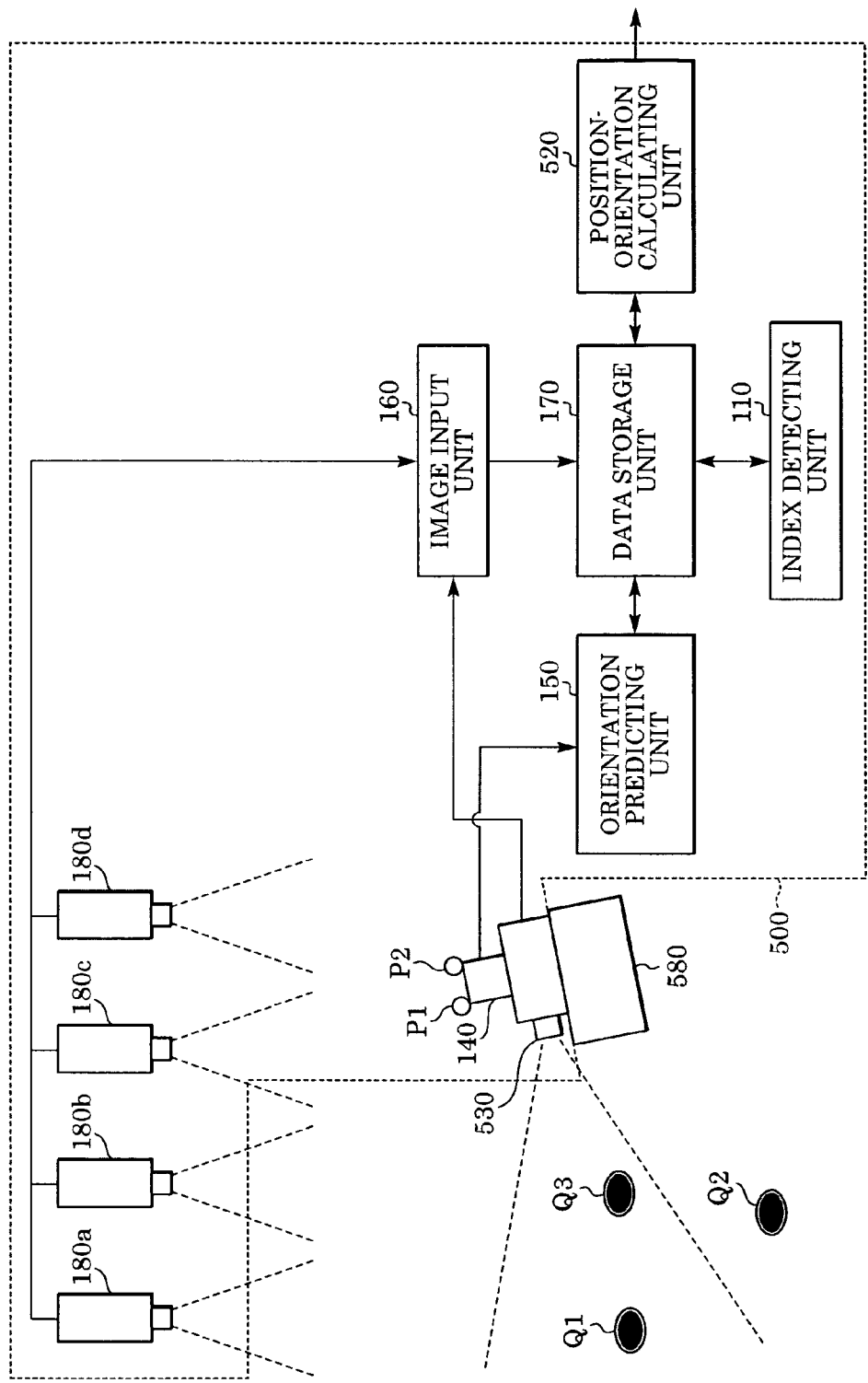
FIG. 9 is a block diagram showing a position-and-orientation measuring apparatus according to a first modification of the second embodiment of the present invention.

FIG. 9 is a block diagram showing the configuration of the position-and-orientation measuring apparatus (denoted by reference numeral 500) according to the first modification of the second embodiment. As shown in FIG. 9, the position-and-orientation measuring apparatus 500 includes bird's-eye view cameras 180*a*, 180*b*, 180*c*, and 180*d*, an image input unit 160, a data storage unit 170, an index detecting unit 110, an orientation sensor 140, an orientation predicting unit 150, a position-orientation detecting unit 520, and a subjective viewpoint camera 530.

Portions of the position-and-orientation measuring apparatus 500 which are identical in function to those in the second embodiment are denoted by reference numerals identical to those shown in FIG. 6. Accordingly, their description is omitted. The position-and-orientation measuring apparatus 500 differs from the second embodiment in that an image captured by the subjective viewpoint camera 530 is input as a subjective viewpoint image to the image input unit 160, that a predicted orientation value obtained by the orientation predicting unit 150 is the orientation of the subjective viewpoint camera 530, and that the orientation sensor 140 is mounted on the subjective viewpoint camera 530.

The subjective viewpoint camera 530 is fixedly mounted on the targeted object 580. The position and orientation of the targeted object 580 in a subjective viewpoint camera coordinate system should be known.

Predicted orientation value R* of the subjective viewpoint camera 530, sets of the image coordinates and world coordinates of each subjective viewpoint index detected by the index detecting unit 110, and sets of the image coordinates of each bird's-eye view and subjective viewpoint camera coordinates corresponding thereto are input from the data storage unit 170 to the position-orientation detecting unit 520. Based on the above information, the position-orientation detecting unit 520 calculates the position and orientation of the subjective viewpoint camera 530 by performing processing similar to that by the position-orientation calculating unit 120 in the second embodiment. In addition, the position-orientation detecting unit 520 outputs the calculated position to the data storage unit 170, and updates an azimuth-drift-error correction value stored in the data storage unit 170 by using update value ϕ of an azimuth-drift-error correction value of the orientation sensor 140 which is derived from the process of calculating the position and orientation.

Based on the position and orientation (in the world coordinate system) of the subjective viewpoint camera 530, which are calculated as described above, and the position and orientation of the targeted object 580 in the camera coordinate system, which are known values, the position-orientation detecting unit 520 calculates the position and orientation of the targeted object 580. The calculated position and orientation are output to the exterior through the interface 1009.

The above manner realizes measurement of the position and orientation of the arbitrary targeted object.

In the first modification of the second embodiment, after temporarily finding the position and orientation of the subjective viewpoint camera 530, the position-orientation detecting unit 520 finds the position and orientation of the targeted object 580. However, the position-orientation detecting unit 520 may directly find the position and orientation of the targeted object 580. In this case, the orientation predicting unit 150 is configured to estimate the position and orientation of the targeted object 580 ($R_{SC}$ in expression (14) is set to be a 3-by-3 matrix for transforming the orientation from the coordinate system of the targeted object to the sensor coordinate system). In addition, the position of the targeted object 580 is set as an element of state vector s, and expression (17) for finding subjective viewpoint camera coordinates $x_C^{Qkn}$ of the subjective viewpoint index from state vector s is replaced by $$x_C^{Q_{k_n}} = \begin{bmatrix} x_C^{Q_{k_n}} \\ y_C^{Q_{k_n}} \\ z_C^{Q_{k_n}} \end{bmatrix} = R_{CO} \cdot (\Delta R(\phi) \cdot R_\tau^*)^{-1} \left( x_W^{Q_{k_n}} - \begin{bmatrix} x \\ y \\ z \end{bmatrix} \right) + t_{CO} \quad (33)$$

and expression (20) for finding world coordinates $x_W^{Pkm}$ of the bird's-eye view index is replaced by $$x_W^{P_{k_m}} = \begin{bmatrix} x_W^{P_{k_m}} \\ y_W^{P_{k_m}} \\ z_W^{P_{k_m}} \end{bmatrix} = \Delta R(\phi) \cdot R^* \cdot R_{CO}^{-1} \cdot \left( x_C^{P_{k_m}} - t_{CO} \right) + \begin{bmatrix} x \\ y \\ z \end{bmatrix} \quad (34)$$

where $R_{CO}$ represents a matrix for transforming the orientation from a targeted object coordinate system (coordinate system in which a point on the targeted object 580 is defined as an origin and three perpendicularly intersecting axes are defined as an X axis, a Y axis, and a Z axis) to the subjective viewpoint camera coordinate system, and $t_{CO}$ represents a vector that transforms a position between identical coordinate systems and should be calculated beforehand based on the position and orientation of the targeted object 580 in the subjective viewpoint camera coordinate system which are stored as known values.

In the first modification of the second embodiment, the targeted object 580 may be an imaging device for capturing images of a scene. In addition, the subjective viewpoint camera 530 may be, for example, upwardly disposed so as to have a field of view different from that of the imaging device for capturing the images of the scene, and subjective viewpoint index $Q_k$ may be accordingly disposed in the field of view of the subjective viewpoint camera 530, e.g. on the ceiling. This contributes to lessen a problem of image deformation, etc., since subjective viewpoint index $Q_k$ is not included in the field of view of the imaging device for capturing the images of the scene. In the first modification of the second embodiment, by mounting a plurality of subjective viewpoint cameras (identical to the subjective viewpoint camera 530) on the targeted object 580, the measurement of the position and orientation of the targeted object 580 may be realized with high accuracy in both position and orientation.

Second Modification of Second Embodiment

In the second embodiment and its first modification, in each of the position-orientation calculating unit 120 and the position-orientation detecting unit 520, four-value state vector s representing an update value of the azimuth-drift-error correction value and a position is used as an unknown value, and such state vector s that minimizes the sum of errors between detected coordinates (actually measured values) and calculated values of the subjective viewpoint index and bird's-eye view index is found. In the second modification of the second embodiment, a geometric index restraining condition is used. A position-and-orientation measuring apparatus according to the second modification of the second embodiment is characterized in that a position-orientation detecting unit using a technique different from an entire error minimizing technique is included as a component.

The position-and-orientation measuring apparatus according to the second modification of the second embodiment is basically similar in configuration to that according to the second embodiment. However, in this second modification, the position-orientation calculating unit 120 in the second embodiment is replaced by a position-orientation calculating unit 120' (not shown) different therefrom. In other words, a process of the position-orientation calculating unit 120' differs from that of the position-orientation calculating unit 120 in the second embodiment. The position-and-orientation measuring apparatus according to the second modification of the second embodiment and a position-and-orientation measuring method therefor are described below.

In the second modification of the second embodiment, functional units (an image input unit 160, a data storage unit 170, an index detecting unit 110, an orientation predicting unit 150, and the position-orientation calculating unit 120') are treated as software which is to be executed in a single computer. The basic configuration of this computer is as shown in FIG. 2.

Figure 10:
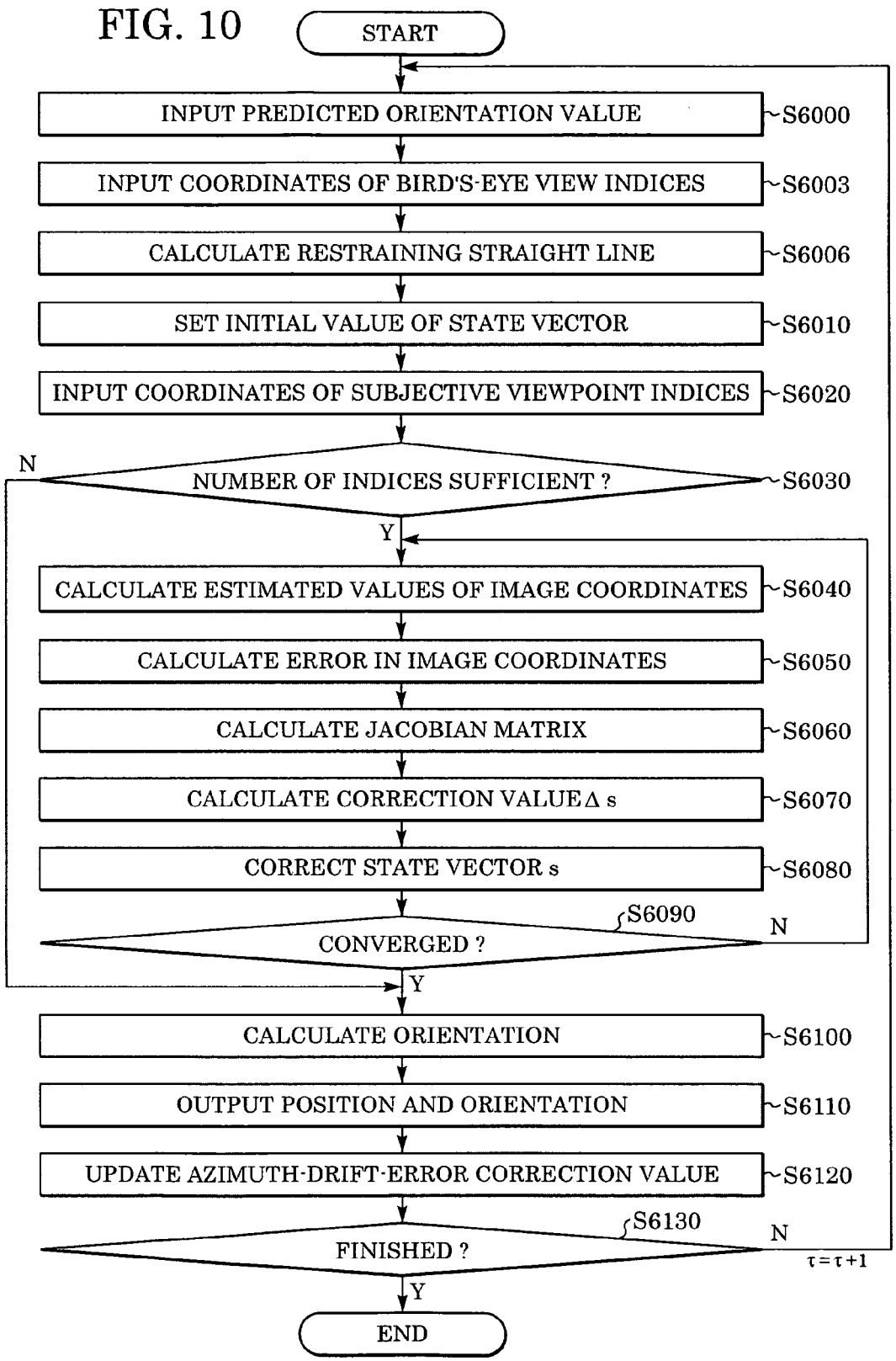
FIG. 10 is a flowchart showing a process which calculates parameters representing the position and orientation of the imaging device and which is performed such that the software program of a position-orientation calculating unit is executed by the CPU.

FIG. 10 is a flowchart showing a process which calculates parameters representing the position and orientation of the imaging device 130 and which is executed such that the CPU 1001 executes the software program of the position-orientation calculating unit 120'. In a stage prior to implementation of the following processing, program code in accordance with the above flowchart should be loaded into the RAM 1002 beforehand.

In step S6000, predicted orientation value R* (the output of the orientation predicting unit 150) of the orientation of the imaging device 130 is input from the data storage unit 170 to the position-orientation calculating unit 120'.

In step S6003, a set of the image coordinates and camera coordinates of a bird's-eye view index detected by the index detecting unit 110 is input to the position-orientation calculating unit 120'.

When a plurality of bird's-eye view indices are mounted or a plurality of bird's-eye view cameras are installed, projected images of the bird's-eye view indices are detected, so that a situation occurs in which the image coordinates of each image are input. In the second modification of the second embodiment, even in the above case, the number of bird's-eye view indices for use in subsequent processing is regarded as one, and the position-orientation calculating unit 120' selects one appropriate point as image coordinates $u_P$ of bird's-eye view index P.

In step S6006, based on image coordinates $u_P$, the position-orientation calculating unit 120' calculates a parameter representing a straight line restraining the position of bird's-eye view index P in the world coordinate system. At first, based on image coordinates $u_P$, straight line slopes (direction vectors) $h_x$, $h_y$, and $h_z$ in the world coordinate system are calculated by using the following expression:

$$\begin{bmatrix} h_x \\ h_y \\ h_z \end{bmatrix} = R_{WB} \cdot \begin{bmatrix} u_x^P / f_x^B \\ u_y^P / f_y^B \\ 1 \end{bmatrix} \quad (35)$$

where $R_{WB}$ represents a 3-by-3 matrix representing an orientation in the world coordinate system of the bird's-eye view cameras 180a, 180b, 180c, and 180d, which detect bird's-eye view index P, and $f^B_x$ and $f^B_y$ respectively represent focal distances in the X axis and Y axis directions, and are stored as known values in the external storage device 1007 beforehand. In this case, a point on the straight line in the world coordinate system can be represented as a function of parameter τ in the following expression:

$$l_W(\tau) = \begin{bmatrix} h_x \\ h_y \\ h_z \end{bmatrix} \tau + t_{WB} \quad (36)$$

where $t_{WB}$ represents the position in the world coordinate system of one of the bird's-eye view cameras 180a, 180b, 180c, and 180d, and is stored as a known value in the external storage device 1007 beforehand. The straight line represented by expression (36) passes through the position in the world coordinate system of one of the bird's-eye view cameras 180a, 180b, 180c, and 180d, and the position of the bird's-eye view index P, and the position of the bird's-eye view index P is obtained such that parameter τ takes an appropriate value.

A total of two parameters, that is, parameter τ setting the position of the bird's-eye view index P in the world coordinate system and update value φ of the azimuth-drift-error correction value of the orientation sensor 140, are hereinafter treated as unknown parameters to be calculated. In the following, the unknown parameters to be calculated are described by two-valued state vector $s'=[\tau \ \phi]^T$.

In step S6010, the position-orientation calculating unit 120' sets appropriate initial value $s'=[\tau_{-1} \ 0]^T$ as state vector s'. In this setting, for example, τ that represents a position on line $l_W$ closest to world coordinates of bird's-eye view index P which are obtained from the position of the imaging device 130 obtained in previous processing is set as $\tau_{-1}$.

In step S6020, a set of the image coordinates and world coordinates of each subjective viewpoint index detected in the index detecting unit 110 is input to the position-orientation calculating unit 120'.

In step S6030, the position-orientation calculating unit 120' determines whether or not the number N of the input subjective viewpoint indices is at least one. If the number N of the input subjective viewpoint indices is less than one, the process proceeds to steps S6100 without performing updating of s' implemented in steps S6040 to S6090.

In step S6040, for each subjective viewpoint index $Q^{kn}$, estimated value $u^{Q^{kn}*}$ of the image coordinates is calculated based on the following expression that finds subjective viewpoint camera coordinates (coordinates in the subjective viewpoint camera coordinates) $x_C^{Q_{kn}}$ from world coordinates $x^{wQ_{kn}}$ and s':

$$x_C^{Q_{kn}} = \begin{bmatrix} x_C^{Q_{kn}} \\ y_C^{Q_{kn}} \\ z_C^{Q_{kn}} \end{bmatrix} = (\Delta R(\phi) \cdot R^*)^{-1} \left( x_W^{Q_{kn}} - l_W(\tau) \right) + x_C^P \quad (37)$$

and expression (18) that finds image coordinates $u^{Q_{kn}*}$ from camera coordinates $x_C^{Q_{kn}}$, where $x_C^P$ represents coordinate values of index P in the subjective viewpoint camera coordinate system and is stored as known information in the external storage device 1007 beforehand.

In other words, assuming that the position and orientation of the imaging device 130 obey the state vector s' previously obtained, an estimated image-coordinate value of each subjective viewpoint index is found in accordance with a relationship in position and orientation between the imaging device 130 and the subjective viewpoint index.

In step S6050, for the subjective viewpoint index $Q^{kn}$, the position-orientation calculating unit 120' calculates error $\Delta u^{Q_{kn}}$ between estimated value $u^{Q_{kn}*}$ and actually measured value $u^{Q_{kn}}$ of the image coordinate on the basis of expression (23).

In step S6060, for the subjective viewpoint index $Q^{kn}$, the position-orientation calculating unit 120' calculates 2-by-2 Jacobian matrix $J_{us'}^{Q_{kn}}$ (=∂u/∂s') having, as elements, solutions obtained by partially differentiating an image Jacobian (i.e., function $f_c(\ )$ in expression (14)) (composed of expressions (37) and (18) in the second modification of the second embodiment, and state vector s serves as s') concerning state vector s' with respect to each element of s'. Specifically, after calculating 2-by-3 Jacobian matrix $J_{ux}^{Q_{kn}}$ (=∂u/∂x) having, as elements, solutions obtained by partially differentiating the right side of expression (18) with respect to each element of camera coordinate $x_C^{Q_{kn}}$, and 3-by-2 Jacobian matrix $J_{xs'}^{Q_{kn}}$ (=∂x/∂s') having, as elements, solutions obtained by partially differentiating the right side of expression (37) with respect to each element of vector s', 2-by-2 Jacobian matrix $J_{us'}^{Q_{kn}}$ (=∂u/∂s') is calculated based on expression (25) (however s is replaced by s') by using the calculated matrices.

In step S6070, the position-orientation calculating unit 120' calculates correction value Δs' of state vector s' by using expression (27) (s is replaced by s'). In the second modification of the second embodiment, U represents a 2N-dimensional error vector in which errors $\Delta u^{Q_{kn}}$ are vertically arranged for each subjective viewpoint index, and Θ represents a 2N-by-2 matrix in which image Jacobians $J_{us'}^{Q_{kn}}$ obtained for the subjective viewpoint index are vertically arranged.

In step S6080, by using the correction value Δs' calculated in step S6070, the position-orientation calculating unit 120' corrects state vector s' based on expression (30) (s is replaced by s') and uses the obtained value as a new estimated value.

In step S6090, the position-orientation calculating unit 120' determines whether or not calculation converges by using a criterion such as determining whether or not error vector U is less than a predetermined threshold value, or determining whether or not correction value Δs' is less than a predetermined threshold value. If the calculation does not converge, the position-orientation calculating unit 120' performs step S6040 and the subsequent steps again by using state vector s' obtained after correction.

If, in step S6090, it is determined that the calculation converges, in step S6100, the position-orientation calculating unit 120' calculates the orientation of the imaging device 130 from the obtained state vector s'. Calculation of orientation R is performed by using the update value φ of the azimuth-drift-error correction value which is obtained up to the previous step on the basis of expression (31). In addition, calculation of position t is performed by using the parameter τ and orientation R obtained up to the previous step on the basis of the following expression:

$$t = l_W(\tau) - R \cdot x_C^P \quad (38)$$

In step S6110, the position-orientation calculating unit 120' outputs information of the position and orientation of the imaging device 130 to the exterior through the interface 1009. The position-orientation calculating unit 120' also outputs the position t of the imaging device 130 to the data storage unit 170. An output form of the position and orientation may be a set of orientation-representing 3-by-3 matrix R and position-representing three-dimensional vector t, Euler angles obtained by transforming orientation elements, a viewing transformation matrix calculated from a position and orientation, or any of other position-and-orientation describing methods.

In step S6120, by using the update value φ of the azimuth-drift-error correction value obtained in the above calculating steps, the position-orientation calculating unit 120' updates the azimuth-drift-error correction value φ* stored in the data storage unit 170 based on the expression (32).

In step S6130, the position-orientation calculating unit 120' determines whether or not to finish the process. If the position-orientation calculating unit 120' determines not to finish the process, it proceeds to step S6000 and executes similar processing on input data in the next frame and the subsequent frames.

In the above process, a straight line on which a bird's-eye view index obtained from the bird's-eye view cameras 180a, 180b, 180c, and 180d exists is used as a restraint condition, and under this restraint condition, such position and orientation of the imaging device 130 as to minimize error in subjective viewpoint index on a subjective viewpoint image can be obtained.

The result of measurement of the position and orientation in the second modification of the second embodiment more preferentially relies on information obtained from the bird's-eye view cameras 180a, 180b, 180c, and 180d compared with the result of measurement of the position and orientation in the second embodiment. Accordingly, in a situation in which the reliability of information obtained from the bird's-eye view cameras 180a, 180b, 180c, and 180d is relatively higher than that obtained from the imaging device 130, for example, when a high resolution bird's-eye view camera is available, and when only a marker having very high detection accuracy is available, the position-and-orientation measuring apparatus according to the second modification of the second embodiment functions more effectively compared with the second embodiment.

Third Modification of Second Embodiment

In the second embodiments and their modifications, each of the position-orientation calculating units 120, 520, and 120' finds an update value, which is an unknown value, of the azimuth-drift-error correction value of the orientation sensor 140. However, correction values of error in the three axis directions of the orientation sensor 140 can be found without limiting correcting items of orientation to only azimuth directions. A position-and-orientation measuring apparatus according to the third modification of the second embodiment is almost identical in configuration to that according to the second embodiment. Accordingly, portions different from those in the second embodiment are described below.

In the third modification of the second embodiment, the data storage unit 170 stores rotation-error correction matrix ΔR* of the orientation sensor 140 instead of azimuth-drift-error correction value φ* of the orientation sensor 140.

In the third modification of the second embodiment, instead of azimuth-drift-error correction value φ*, rotation-error correction matrix ΔR* of the orientation sensor 140 is input to the orientation predicting unit 150 (step S3010). The orientation predicting unit 150 calculates predicted orientation value R* (step S3020) based on the following expression instead of expression (14):

$$R^* = \Delta R^* \cdot R \# \cdot R_{SC} \quad (39)$$

In the position-orientation calculating unit 120 in the third modification of the second embodiment, the position of $t=[x\ y\ z]^T$ of the imaging device 130 and three-valued representation $\omega = [\xi\ \psi\ \zeta]^T$ of the orientation R of the imaging device 130, that is, a total of six parameters are treated as unknown parameters to be calculated. The unknown parameters to be calculated are hereinafter written as six-value state vector $s'' = [x\ y\ z\ \xi\ \psi\ \zeta]^T$.

Although there are various methods that represent orientation (rotating matrix) by using three values, in this modification, the orientation should be represented by such three-valued vector that the vector magnitude is defined by a rotating angle and the vector direction defines the direction of a rotation axis. Orientation ω can be represented either by $$R(\omega) = \begin{bmatrix} \frac{\xi^2}{\theta^2}(1-\cos\theta) + \cos\theta & \frac{\xi\psi}{\theta^2}(1-\cos\theta) - \frac{\zeta}{\theta}\sin\theta & \frac{\xi\zeta}{\theta^2}(1-\cos\theta) + \frac{\psi}{\theta}\sin\theta \\ \frac{\psi\xi}{\theta^2}(1-\cos\theta) + \frac{\zeta}{\theta}\sin\theta & \frac{\psi^2}{\theta^2}(1-\cos\theta) + \cos\theta & \frac{\psi\zeta}{\theta^2}(1-\cos\theta) - \frac{\xi}{\theta}\sin\theta \\ \frac{\zeta\xi}{\theta^2}(1-\cos\theta) - \frac{\psi}{\theta}\sin\theta & \frac{\zeta\psi}{\theta^2}(1-\cos\theta) + \frac{\xi}{\theta}\sin\theta & \frac{\zeta^2}{\theta^2}(1-\cos\theta) + \cos\theta \end{bmatrix} \quad (40)$$

where $$\theta = \sqrt{\xi^2 + \psi^2 + \zeta^2}$$

Thus, orientation ω can be represented by 3-by-3 rotating matrix R. Accordingly, ω and R can be uniquely transformed to each other. A detailed description of transformation from R to ω is omitted since the transformation is well-known.

In the third modification of the second embodiment, the position-orientation calculating unit 120 sets $s'' = [x_{-1}\ y_{-1}\ z_{-1}\ \xi^*\ \psi^*\ \zeta^*]^T$ as the initial value of state vector s'' (step S4010). In this expression, $x_{-1}, y_{-1}, $ and $z_{-1}$ represents the position of the imaging device 130 which is calculated in the previous processing, and $\xi^*, \psi^*,$ and $\zeta^*$ represent three-valued representation obtained from predicted orientation value R*.

In the third modification of the second embodiment, the position-orientation calculating unit 120 sets branching based on the number of input indices (step S4030) by determining whether or not a total number of the input indices is at least three.

In the position-orientation calculating unit 120 in the third modification of the second embodiment, an expression that finds subjective viewpoint camera coordinate $x_C^{Qkn}$ of subjective viewpoint index $Q_{kn}$ from world coordinate $x_W^{Qkn}$ of the index and s (s'' in this third modification), and an expression that finds world coordinate $x_W^{Pkm}$ of bird's-eye view index $P_{km}$ from subjective viewpoint camera coordinate $x_C^{Pkm}$ of the index and s (s'' in this third modification) are changed from expressions (17) and (20) in the second embodiment to the following expressions:

$$x_C^{Q_{kn}} = \begin{bmatrix} x_C^{Q_{kn}} \\ y_C^{Q_{kn}} \\ z_C^{Q_{kn}} \end{bmatrix} = R(\omega)^{-1}\left(x_W^{Q_{kn}} - \begin{bmatrix} x \\ y \\ z \end{bmatrix}\right) \quad (41)$$

$$x_W^{P_{km}} = \begin{bmatrix} x_W^{P_{km}} \\ y_W^{P_{km}} \\ z_W^{P_{km}} \end{bmatrix} = R(\omega) \cdot x_C^{P_{km}} + \begin{bmatrix} x \\ y \\ z \end{bmatrix} \quad (42)$$

Accordingly, an image Jacobian for each index is 2-by-6 Jacobian matrix $J_{us''}^{Qkn}$ (=∂u/∂s'').

In the third modification of the second embodiment, the position-orientation calculating unit 120 uses the obtained state vector s'' to calculate orientation R of the imaging device 130 on the basis of expression (40).

In this third modification, in step S4120, the position-orientation calculating unit 120 uses the orientation R of the imaging device 130 obtained in the above calculating step to calculate rotation-error correction matrix ΔR* of the orientation sensor 140 on the basis of the following expression:

$$R \cdot R^{*-1} \cdot \Delta R^* \rightarrow \Delta R^* \quad (43)$$

and updates a value stored in the data storage unit 170.

The above processing measures the position and orientation of the imaging device 130.

Fourth Modification of Second Embodiment

In the second embodiment and its modifications, by using the bird's-eye view cameras 180*a*, 180*b*, 180*c*, and 180*d* fixed to the world coordinate system, images of bird's-eye view indices $P_k$ disposed on (the orientation sensor mounted on) the imaging device 130 are captured. However, the configuration for acquiring the position and orientation of the imaging device 130 is not limited to the second embodiment and its modifications. A position-and-orientation measuring apparatus according to the fourth modification of the second embodiment is characterized in having a configuration in which upper view cameras 180 (different from the imaging device 130) fixed to the imaging device 130 capture images of upper view indices $P_k$ disposed in the world coordinate system, instead of using bird's-eye view cameras. The position-and-orientation measuring apparatus according to the fourth modification of the second embodiment and a position-and-orientation measuring method therefor are described below.

Figure 11:
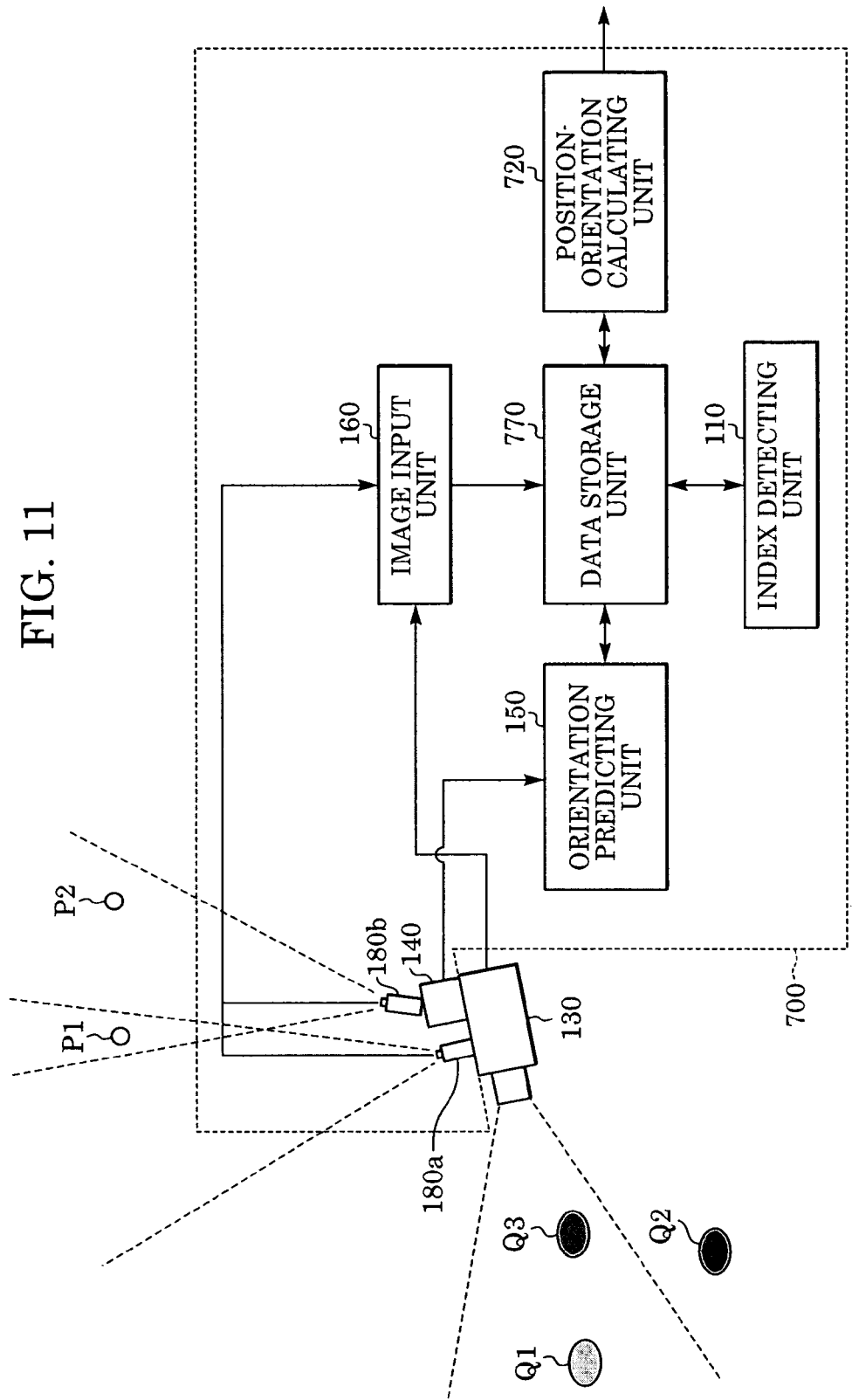
FIG. 11 is a block diagram showing a position-and-orientation measuring apparatus according to a fourth modification of the second embodiment of the present invention.

FIG. 11 shows the configuration of the position-and-orientation measuring apparatus according to the fourth modification of the second embodiment. As shown in FIG. 11, the position-and-orientation measuring apparatus (denoted by reference numeral 700) according to the fourth modification of the second embodiment includes upper view cameras 180a and 180b, an image input unit 160, a data storage unit 770, an index detecting unit 110, an orientation sensor 140, an orientation predicting unit 150, and a position-orientation calculating unit 720. The position-and-orientation measuring apparatus 700 is connected to the imaging device 130. Portions having functions identical to those in the second embodiment are denoted by reference numerals identical to those shown in FIG. 6. Accordingly, a description of the portions is omitted.

The upper view cameras 180a and 180b, whose positions and orientations in the subjective viewpoint camera coordinate system are known, are fixedly disposed on the imaging device 130. Hereinafter, we use a term "upper view camera" to indicate the camera that is placed on the imaging device 130 and has a field-of-view which is different from that of the imaging device 130; the direction of the camera is not limited to the "upper" direction. At a plurality of positions in the real space, in addition to subjective viewpoint indices $Q_k$, whose images are to be captured by the imaging device 130, a plurality of upper view indices $P_k$ ($k=1, \ldots, K_p$) whose positions $x_W^{Pk}$ in the world coordinate system are known are disposed as indices for use in image capturing by the upper view cameras 180a and 180b. In the state shown in FIG. 11, three subjective viewpoint indices $Q_1$, $Q_2$, and $Q_3$ and two upper view indices $P_1$ and $P_2$ are set, and, among them, two subjective viewpoint indices $Q_1$ and $Q_3$ are included in a field of view of the imaging device 130, upper view index $P_1$ is included fields of view of the upper view cameras 180a and 180b, and upper view index $P_2$ is included in the field of view of the upper view camera 180b. In the case shown in FIG. 11, regarding the number of indices detected in a subjective viewpoint image and the number of indices detected in each upper view image, N=2, $M_a$=1, and $M_b$=2. The index detecting unit 110 outputs the identifiers ($k_1$=1, $k_2$=3, $k_{a1}$=1, $k_{b1}$=1, and $k_{b2}$=2) of indices, the identifiers of cameras capturing images of the indices, and image coordinates $u^{Qk1}$, $u^{Qk2}$, $u_a^{Pka1}$, $u_b^{Pkb1}$, and $u_b^{Pkb2}$ corresponding thereto. The upper view cameras 180a and 180b are disposed so that, when the imaging device 130 is positioned in a measurement range, either of the upper view cameras 180a and 180b can capture images of upper view indices $P_k$. The positions and orientations of the upper view cameras 180a and 180b should be stored as known values in the data storage unit 770 beforehand. A predicted value of the orientation of the imaging device 130, a set of image coordinate $u^{Qkn}$ and world coordinate $x_W^{Qkn}$ of each subjective viewpoint index detected by the index detecting unit 110, and sets of image coordinates $u^{Pkm}$ of each upper view index and world coordinates $x_W^{Pkm}$ corresponding thereto are input from the data storage unit 770 to the position-orientation calculating unit 720. Based on these pieces of information, the position-orientation calculating unit 720 calculates the position and orientation of the imaging device 130 and outputs the calculated position and orientation to the exterior through an interface (not shown). In addition, the position-orientation calculating unit 720 outputs the calculated position of the imaging device 130 to the data storage unit 770. Moreover, the position-orientation calculating unit 720 updates an azimuth-drift-error correction value stored in the data storage unit 770 by using an updated azimuth-drift-error correction value of the orientation sensor 140, which is derived in the process of calculating the position and orientation. The data storage unit 770 stores various types of data, such as an azimuth-drift-error correction value, images input from the image input unit 160, a predicted value of the orientation input from the orientation predicting unit 150, a calculated position value input from the position-orientation calculating unit 150, the image coordinates and identifiers of indices input from the index detecting unit 110, the world coordinates of subjective viewpoint indices, which are known values, the world coordinates of upper view indices, and the positions and orientations of the upper view cameras 180a and 180b in the subjective viewpoint camera coordinate system. The various types of data are input/output from/to the data storage unit 770, if necessary.

The flowchart of a process for calculating parameters representing the position and orientation of the imaging device 130 in the fourth modification of the second embodiment is almost identical to the flowchart (FIG. 8) in the second embodiment. In the following, only portions different from those in the second embodiment are described.

In step S4020, instead of image coordinates and subjective viewpoint camera coordinates (coordinate values in the subjective viewpoint camera coordinate system) of the bird's-eye view indices, image coordinates and world coordinates of the upper view indices are input to the position-orientation calculating unit 720.

In step S4040, calculation of estimated image coordinate value $u^{Pkm*}$ of each upper view index $P_{km}$ is performed by using the following function of world coordinate $x_W^{Pkm}$ of the upper view index $P_{km}$ and the present state vector s:

$$u^{P_{km}*} = F_D(x_W^{P_{km}}, s) \tag{44}$$

Specifically, function $F_D(\ )$ consists of the following expression:

$$x_C^{P_{km}} = \begin{bmatrix} x_C^{P_{km}} \\ y_C^{P_{km}} \\ z_C^{P_{km}} \end{bmatrix} = (\Delta R(\phi) \cdot R^*)^{-1} \left( x_W^{P_{km}} - \begin{bmatrix} x \\ y \\ z \end{bmatrix} \right) \tag{45}$$

for finding camera coordinates (coordinates in the subjective viewpoint camera coordinate system) $x_C^{Pkm}$ from world coordinates $x_W^{Pkm}$ and state vector s, the following expression:

$$x_B^{P_{km}} = \begin{bmatrix} x_B^{P_{km}} \\ y_B^{P_{km}} \\ z_B^{P_{km}} \end{bmatrix} = R_{CB}^{-1} (x_C^{P_{km}} - t_{CB}) \tag{46}$$

for finding, from subjective viewpoint camera coordinates $x_C^{Pkm}$, upper view camera coordinates $x_B^{Pkm}$ (the coordinates of the index in the upper view camera coordinate system that is a coordinate system in which a point on one of the upper view cameras 180a and 180b is defined as an origin and three perpendicularly intersecting axes are defined as an X axis, a Y axis, and a Z axis), and expression (22) for finding image coordinates $u^{Pkm*}$ from upper view camera coordinates $x_B^{Pkm}$, where $f^B_x$ and $f^B_y$ respectively represent focal distances in the X axis and Y axis directions of each of the upper view cameras 180a and 180b, $R_{CB}$ represents a 3-by-3 matrix representing the orientation of each of the upper view cameras 180a and 180b, $t_{CB}$ represents a three-dimensional vector representing the position of each of the upper view cameras 180a and 180b, and is stored beforehand as a known value for each of the upper view cameras 180a and 180b. As described above the position and orientation of the imaging device 130.

Although the fourth modification of the second embodiment uses the plurality of upper view cameras 180a and 180b, it is not always necessary to use the plurality of upper view cameras 180a and 180b, and it is obvious that, even if a single upper view camera is used, advantages similar to those in the fourth modification of the second embodiment can be obtained.

Also in the first to third modification of the second embodiment, instead of using bird's-eye view cameras, the configuration described in the fourth modification of the second embodiment is applicable, in which the upper view cameras 180a and 180b fixed to the imaging device 130 can capture images of upper view indices $P_k$ disposed in the world coordinate system.

Other Modifications

Although each of the above embodiments and its modifications uses a Gauss-Newton method, which is represented by expression (9) or (27), for calculating Δs based on error vector U and matrix Θ, the calculation of correction value Δs does not always need to be performed by using the Gauss-Newton method. For example, the calculation may be performed by using the Levenberg-Marquardt (LM) method, which is a known iterative method to solve a nonlinear equation. In addition, a statistical technique, such as M estimation that is a known robust estimation technique, may be combined and any of other numerical calculating techniques may be applied.

Each of the above embodiments and its modifications uses, for each input image, a nonlinear optimization technique for finding the optimal solution (which minimizes error). However, a technique which, based on an error in index on the image, eliminates the error is not limited to the nonlinear optimization technique. Even if another technique is used, the use of the technique does not impair the nature of the present invention in which, based on image information acquired from bird's-eye view cameras, as well as the image information from the subjective camera(s) in the second embodiment, by calculating the position of a targeted object to be measured and an azimuth-drift-error correction value of an orientation sensor, the position and orientation of the targeted object are stably obtained with high accuracy. In the case of using, for example, an extended Kalman filter and an iterative extended Kalman filter, which are known as techniques that, based on an error in index on an image, find a solution eliminating the error, and which are described in detail in J. Park, B. Jiang, and U. Neumann, "Vision-based pose computation: robust and accurate augmented reality tracking", Proc. Second International Workshop on Augmented Reality (IWAR'99), pp. 3-12, 1999, by defining s as a state vector in each of the above embodiments and the modifications, and defining expression (3) or (16) and (19) as (an) observation function(s), a filter having advantages of each of the above embodiments can be formed.

In addition, in the above embodiments and its modifications, such indices (hereinafter referred to as "point indices") that each index indicates a set of coordinates are used. However, the indices are not limited to index types. Other types of indices may be used.

For example, each of the above embodiments and its modifications may use, as a subjective viewpoint index and/or bird's-eye view index, such a specific geometric shape marker as used in a known position-and-orientation measuring apparatus (see, for example, Takahashi, Ishii, Makino, Nakashizu, "*VR Intafesu-notameno Tangan-niyoru Chohokei Maka Ichi-shisei-no Koseido Jitsujikan Suiteiho* (Method for Real-Time Estimation of the Position And Orientation of Rectangular Marker through Single View for VR interface)", *Sanjigen Konfarensu 96 Koen Ronbunshu* (Three-dimensional Conference '96 Collected Papers), pp. 167-172, 1996). For example, when a quadrangle marker is used as an index, by storing the world coordinates of the vertices of the quadrangle as known values, or calculating these values from the position, orientation, and size of the marker, and detecting the image coordinates of the vertices from an image, an advantage can be obtained which is similar to that obtained in the case of using four markers in the first embodiments and its modifications. In particular, it may be said that a configuration having one quadrangle marker (having ID information) on a targeted object to be measured, or a configuration having one quadrangle marker mounted on an orientation sensor is a particularly suitable form because it is expected that the configuration has good accuracy and identification of marker detection from the image. Regarding the quadrangle marker, see, for example, Kato, M. BillingHurst, Asano, Tachibana, "*Maka Tsuiseki-nimotozuku Kakuchogenjitsukan Shisutemuto Sono Kyariburehshon* (Augmented Reality System based on Marker Tracking and Calibration Thereof)", *Nippon Bacharu Riarithi Gakkai Ronbunshi* (The Virtual Reality Society of Japan, Collected Papers), vol. 4, no. 4, pp. 607-616, 1999.

In addition, the above embodiments and its modifications may use such a line feature index (hereinafter referred to as a "line index") as used in another known position-and-orientation measuring apparatus (see, for example, D. G. Lowe "Fitting parameterized three-dimensional models to images", IEEE Transactions on PAMI, vol. 13, no. 5, pp. 441-450, 1991). For example, by forming, as a reference for evaluating a distance from the origin of a straight line, error vector U based on error Δd calculated from detected value d from an image and state vector s, and forming matrix Θ by 1-by-4 Jacobian matrix $J_{ds}$ (=∂d/∂s) having, as elements, solutions obtained by partially differentiating the expression for calculating d* with respect to each element of state vector s, position and orientation measurement can be performed by a mechanism similar to that in the first embodiment and its modifications. In addition, by summing errors and image Jacobians obtained from line indices, point indices, and other indices, their features are jointly used. Especially, in the second embodiment and its first, second and third modifications, it is possible to use different types of indices as subjective viewpoint indices and bird's-eye view indices. One of the preferred examples is using natural line indices as subjective viewpoint indices and colored spherical markers as bird's-eye view indices.

In the second embodiment and its modifications, the number of subjective viewpoint cameras 530 is one. However, a plurality of subjective viewpoint cameras may be mounted on the targeted object 580 for position and orientation measurement. In this case, the orientation predicting unit 150 and the index detecting unit 110 process an image input from each camera. In addition, the orientation predicting unit 150 and the position-orientation detecting unit 520 perform arithmetic operations by using the position and orientation of the targeted object 580 as references. The position-orientation detecting unit 520 uses a mechanism similar to that in each embodiment to estimate a position and orientation by forming state vector s based on the position of the targeted object 580 and the azimuth-drift-error correction value, finding an error of each index and image Jacobian from index information obtained from each image on the basis of expression (33) ($R_{co}$ and $t_{CO}$ differ for each camera), and accumulating the obtained values to form error vector U and matrix $\Theta$.

In addition, in each of the first to fourth modifications of the second embodiment, the number of imaging devices 130 is one. However, even when two imaging devices are measured as in the case of a stereo video see-through head mount display, one imaging device (e.g., an imaging device for the left eye) is used as a reference, in a similar technique, position and orientation measurement can be performed.

Although the above embodiments and its modifications use an orientation sensor having an azimuth drift error, another type of orientation sensor having a significant error only in the azimuth direction may used as the orientation sensor. By also using, for example, a type of orientation sensor in which an angle in inclination direction is measured by an acceleration sensor and an angle in azimuth direction is measured by a geomagnetic sensor, the position and orientation of a targeted object can be measured by processing similar to that in the above embodiments and its modifications, with the position and update value of the azimuth-drift-error correction value used as unknown parameters. However, since, in this case, the error property differs from the property of the azimuth drift error, this case may not be proper for use in a form such as the third or fourth modification of the first embodiment. Moreover, even if an orientation sensor for measurement only in the inclination direction is used, by assuming that this orientation sensor be a three-axis orientation sensor in which a measured value in the azimuth direction is always zero, the position and orientation of a targeted object can be measured by similar processing.

A camera for image capturing through radiation having wavelengths different from those of visible radiation can be used as each bird's-eye view camera used in each of the above embodiments and its modifications. By way of example, a camera for image capturing through infrared radiation may be used as each bird's-eye view camera, and an index that emits or reflects infrared radiation may be used each bird's-eye view index. This case has an advantage in the second embodiment in that, since an image of a subjective viewpoint index is not captured by the bird's-eye view camera, false detection of the subjective viewpoint index on the bird's-eye view image is eliminated.

In this case, by using, as each bird's-eye view index, a marker that emits infrared radiation with different timing, the index can be identified. In other words, after the index detecting unit 110 extracts a region corresponding to the marker from the bird's-eye view image, the barycentric position of the region may be used as detected coordinates of an index which emits infrared radiation with timing identical to that for image capturing by the bird's-eye view camera. Obviously, when the number of bird's-eye view indices is one, control of emission timing is not required.

Moreover, in the first and fourth modifications of the second embodiment, cameras for image capturing through infrared radiation may be used as the subjective viewpoint camera and the bird's-eye view camera, and indices that that emit or reflect infrared radiation may be used both as the subjective viewpoint index and as the bird's-eye view indices.

In addition, the camera for image capturing through radiation having wavelengths different from those of visible radiation are not limited to the camera for image capturing through infrared radiation, but a camera for image capturing through ultraviolet radiation, or the like, may be used. Moreover, a camera for simultaneous image capturing both through radiation having wavelengths different from those of visible radiation and through visible radiation may be used.

Other Embodiment

It is obvious that the present invention is realized such that a storage medium (or recording medium) containing the program code of software realizing the functions of the above-described embodiments and modifications is provided to a system or an apparatus, and a computer (or CPU/MPU) of the system or apparatus reads and executes the program code in the storage medium. In this case, the program code itself read from the storage medium realizes the functions of the above-described embodiments and modifications. Accordingly, the storage medium containing the program code is included in the present invention. In addition, it is obvious that the present invention includes a case in which the computer executes the read program code, whereby, in addition to realization of the functions of the above-described embodiments and modifications, the program code instructs an operating system, or the like, running on the computer to perform all or part of actual processing, an the processing implements the functions of the above-described embodiments and modifications.

Moreover, obviously, the present invention includes a case in which, after the program code read from the storage medium is written in a memory provided in an add-in card loaded into the computer or in an add-in unit connected to the computer, the program code instructs a CPU provided in the add-in card or add-in unit to perform all or part of actual processing, and the processing implements the functions of the above-described embodiments and modifications.

When the present invention is applied to the above storage medium, the above-described program corresponding to the above flowcharts is stored in the storage medium.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-144893 filed May 14, 2004, Japanese Patent Application No. 2004-144894 filed May 14, 2004, and Japanese Patent Application No. 2005-053441 filed Feb. 28, 2005, which are hereby incorporated by reference herein.

What is claimed is:

1. An information processing method for calculating the position and orientation of an imaging device for capturing images of a scene, the information processing method comprising:
   a first image input step of inputting a first image captured by the imaging device;
   a second image input step of inputting a second image captured by bird's-eye-view imaging means for performing image capturing from a bird's-eye view position of the imaging device;

an orientation input step of inputting a measured orientation value from an orientation sensor for measuring information concerning the orientation of the imaging device;

a first detecting step of detecting, from the first image input in the first image input step, a first-index image-coordinate feature value concerning the image coordinates of a first index disposed in the scene;

a second detecting step of detecting, from the second image input in the second image input step, a second-index image-coordinate feature value concerning the image coordinates of a second index disposed on the imaging device; and a position-and-orientation calculating step of calculating the position and orientation of the imaging device by using the first-index image-coordinate feature value detected in the first detecting step, the second-index image-coordinate feature value detected in the second detecting step, and the measured orientation value input in the orientation input step.

2. The information processing method according to claim 1, wherein, in the position-and-orientation calculating step, a parameter concerning a correcting value for correcting an azimuth error of the orientation sensor and a parameter representing the position of the imaging device, the parameters being regarded as unknown, are found by using the first-index image-coordinate feature value detected in the first detecting step and the second-index image-coordinate feature value detected in the second detecting step, and the position and orientation of the imaging device are calculated by using the obtained parameters.

3. The information processing method according to claim 1, wherein:

the second-index image-coordinate feature value detected in the second detecting step represents the image coordinates of the second index; and in the position-and-orientation calculating step, a straight line retraining the position of the second index in a three-dimensional space is found based on the image coordinates of the second index which are represented by the second-index image-coordinate feature value and the position and orientation of the bird's-eye-view imaging means, and, under such restraint that the second index exists on the straight line, the position and orientation of the imaging device are calculated by using the first-index image-coordinate feature value detected in the first detecting step and the measured orientation value input in the orientation input step.

4. The information processing method according to claim 3, wherein, in the position-and-orientation calculating step, a parameter representing the position of the second index on the straight line and a parameter concerning a correcting value for correcting an azimuth error of the orientation sensor, the parameters being regarded as unknown, are found by using the first-index image-coordinate feature value detected in the first detecting step, and the position and orientation of the imaging device are calculated by using the obtained parameters.

5. An information processing method for calculating the position and orientation of an imaging device for capturing images of a scene, the information processing method comprising:

a first image input step of inputting a first image captured by the imaging device;

a second image input step of inputting a second image captured by a second imaging means for capturing images of the scene from a viewpoint position on the imaging device;

an orientation input step of inputting a measured orientation value from an orientation sensor for measuring information concerning the orientation of the imaging device;

a first detecting step of detecting a first-index image-coordinate feature value concerning the image coordinates of a first index disposed in the scene from the first image input in the first image input step;

a second detecting step of detecting a second-index image-coordinate feature value concerning the image coordinates of a second index disposed in the scene from the second image input in the second image input step; and a position-and-orientation calculating step of calculating the position and orientation of the imaging device by using the first-index image-coordinate feature value detected in the first detecting step, the second-index image-coordinate feature value detected in the second detecting step, and the measured orientation value input in the orientation input step.

6. A computer readable storage medium storing a computer program for causing a computer to perform an information processing method for calculating the position and orientation of an imaging device for capturing images of a scene, comprising:

a first image input step of inputting a first image captured by the imaging device;

a second image input step of inputting a second image captured by bird's-eye-view imaging means for performing image capturing from a bird's-eye view position of the imaging device;

an orientation input step of inputting a measured orientation value from an orientation sensor for measuring information concerning the orientation of the imaging device;

a first detecting step of detecting, from the first image input in the first image input step, a first-index image-coordinate feature value concerning the image coordinates of a first index disposed in the scene;

a second detecting step of detecting, from the second image input in the second image input step, a second-index image-coordinate feature value concerning the image coordinates of a second index disposed on the imaging device; and a position-and-orientation calculating step of calculating the position and orientation of the imaging device by using the first-index image-coordinate feature value detected in the first detecting step, the second-index image-coordinate feature value detected in the second detecting step, and the measured orientation value input in the orientation input step.

7. A computer readable storage medium storing a computer program for causing a computer to perform an information processing method for calculating the position and orientation of an imaging device for capturing images of a scene, comprising:

a first image input step of inputting a first image captured by the imaging device;

a second image input step of inputting a second image captured by a second imaging means for capturing images of the scene from a viewpoint position on the imaging device;

an orientation input step of inputting a measured orientation value from an orientation sensor for measuring information concerning the orientation of the imaging device;

a first detecting step of detecting a first-index image-coordinate feature value concerning the image coordinates of a first index disposed in the scene from the first image input in the first image input step;

a second detecting step of detecting a second-index image-coordinate feature value concerning the image coordinates of a second index disposed in the scene from the second image input in the second image input step; and a position-and-orientation calculating step of calculating the position and orientation of the imaging device by using the first-index image-coordinate feature value detected in the first detecting step, the second-index image-coordinate feature value detected in the second detecting step, and the measured orientation value input in the orientation input step.

8. An information processing apparatus for calculating the position and orientation of an imaging device for capturing images of a scene, the information processing apparatus comprising:

a first image input unit for inputting a first image captured by the imaging device;

a second image input unit for inputting a second image captured by bird's-eye-view imaging means for performing image capturing from a viewpoint position on the imaging device;

an orientation input unit which inputs a measured orientation value from an orientation sensor for measuring information concerning the orientation of the imaging device;

a first detecting unit which, from the first image input in a step of inputting the first image, detects a first-index image-coordinate feature value concerning the image coordinates of a first index disposed in the scene;

a second detecting unit which, from the second image input in a step of inputting the second image, detects a second-index image-coordinate feature value concerning the image coordinates of a second index disposed in the scene; and a position-and-orientation calculating unit which calculates the position and orientation of the imaging device by using the first-index image-coordinate feature value detected by the first detecting unit, the second-index image-coordinate feature value detected by the second detecting unit, and the measured orientation value input by the orientation input unit.

9. An information processing apparatus for calculating the position and orientation of an imaging device for capturing images of a scene, the information processing apparatus comprising:

a first image input unit for inputting a first image captured by the imaging device;

a second image input unit for inputting a second image captured by bird's-eye-view imaging means for performing image capturing from a viewpoint position on the imaging device;

an orientation input unit which inputs a measured orientation value from an orientation sensor for measuring information concerning the orientation of the imaging device;

a first detecting unit which, from the first image input by the first image input unit, detects a first-index image-coordinate feature value concerning the image coordinates of a first index disposed in the scene;

a second detecting unit which, from the second image input by the second image input unit, detects a second-index image-coordinate feature value concerning the image coordinates of a second index disposed on the imaging device; and a position-and-orientation calculating unit which calculates the position and orientation of the imaging device by using the first-index image-coordinate feature value detected by the first detecting unit, the second-index image-coordinate feature value detected by the second detecting unit, and the measured orientation value input by the orientation input unit.

* * * * *